United States Patent
Mulkar et al.

(10) Patent No.: US 11,968,124 B2
(45) Date of Patent: Apr. 23, 2024

(54) SYSTEM AND METHOD FOR MANAGING NETWORK TRAFFIC USING FAIR-SHARE PRINCIPLES

(71) Applicant: Sandvine Corporation, Waterloo (CA)

(72) Inventors: Tushar Mulkar, Karnataka (IN); Anchal Srivastava, Uttar Pradesh (IN); Ambuj Mittal, Bangaluru (IN); Akash Manchanhalli Suresh, Bangaluru (IN); Nilanjan Sarkar, Karnataka (IN); Piyush Agrawal, Bangaluru (IN); Neelesh Dwivedi, Bangalore (IN)

( * ) Notice: Subject to any disclaimer, the term of this patent is extended or adjusted under 35 U.S.C. 154(b) by 0 days.

(21) Appl. No.: 17/864,962

(22) Filed: Jul. 14, 2022

(65) Prior Publication Data
US 2023/0028074 A1    Jan. 26, 2023

(30) Foreign Application Priority Data

Jul. 15, 2021 (IN) .............................. 202111031831
Aug. 27, 2021 (IN) .............................. 202111038938
Jul. 13, 2022 (EP) ..................................... 22184678

(51) Int. Cl.
*H04L 47/22* (2022.01)
*H04L 47/2425* (2022.01)
(Continued)

(52) U.S. Cl.
CPC .......... *H04L 47/22* (2013.01); *H04L 47/2433* (2013.01); *H04L 47/2441* (2013.01);
(Continued)

(58) Field of Classification Search
CPC ..... H04L 47/22; H04L 47/52; H04L 47/2433; H04L 47/2441; H04L 47/2483; H04L 47/40
See application file for complete search history.

(56) References Cited

U.S. PATENT DOCUMENTS 6,959,335 B1 * 10/2005 Hayball ................. H04L 47/70
709/227
2008/0112319 A1 * 5/2008 Saegusa ................. H04L 47/22
370/230.1
(Continued)

FOREIGN PATENT DOCUMENTS

EP          3633939 A1      4/2020
WO     2006108282 A1     10/2006
WO   WO-2020187417 A1 *  9/2020 ......... H04L 41/5003

OTHER PUBLICATIONS

Extended European Search Report, European Patent Office, on EP Application No. 22184661.1, dated Nov. 24, 2022.
(Continued)

*Primary Examiner* — Melanie Jagannathan
(74) *Attorney, Agent, or Firm* — Amarok IP Inc.; Neil W. Henderson

(57) ABSTRACT

A system and method for managing network traffic in a distributed environment. the system including: a plurality of logic modules configured to determine policy data related to bandwidth management and at least one split criteria for a basis for shaping network traffic; a control processor associated with each one of the plurality of logic modules, each control processor configured to determine data associated with each of a plurality of traffic flows at the associated logic module and to coordinate traffic actions over the plurality of logic modules; a packet processor associated with each control processor and configured to determine a traffic action based on each traffic flow and received policy data; and at least two shaper objects configured to receive a split of the traffic flows and enforce the determined traffic action on their respective traffic flow.

13 Claims, 11 Drawing Sheets

(51) Int. Cl.
*H04L 47/2441* (2022.01)
*H04L 47/2483* (2022.01)
*H04L 47/40* (2022.01)
*H04L 47/52* (2022.01)

(52) U.S. Cl.
CPC .......... *H04L 47/2483* (2013.01); *H04L 47/40* (2013.01); *H04L 47/52* (2013.01)

(56) References Cited

U.S. PATENT DOCUMENTS

| | | |
|---|---|---|
| 2010/0208587 A1 | 8/2010 | Landry et al. |
| 2010/0220743 A1* | 9/2010 | Endo .................. H04L 49/9015 370/429 |
| 2011/0176418 A1* | 7/2011 | Gershinsky ............. H04L 47/12 370/230.1 |
| 2014/0269323 A1* | 9/2014 | Mahindra ............... H04L 47/38 370/236.1 |
| 2015/0350083 A1 | 12/2015 | Goodson et al. |
| 2016/0080502 A1* | 3/2016 | Yadav ................. H04L 12/4633 709/227 |
| 2016/0119939 A1* | 4/2016 | Himayat ............... H04W 76/11 370/329 |
| 2017/0250916 A1* | 8/2017 | Peri ......................... H04L 47/22 |
| 2019/0158371 A1 | 5/2019 | Dillon et al. |
| 2020/0112483 A1* | 4/2020 | Sridhar ............... H04L 61/4511 |
| 2020/0174844 A1* | 6/2020 | Bergsma ............... G06F 9/5077 |
| 2021/0367832 A1* | 11/2021 | Ramachandran ....... H04L 69/40 |
| 2022/0046462 A1* | 2/2022 | De Andrade Jardim .................... H04W 28/02 |

OTHER PUBLICATIONS

Extended European Search Report, European Patent Office, on EP Application No. 22184678.5, dated Nov. 25, 2022.
Extended European Search Report, European Patent Office, on EP Application No. 22192287.5, dated Jan. 4, 2023.

* cited by examiner

SYSTEM AND METHOD FOR MANAGING NETWORK TRAFFIC USING FAIR-SHARE PRINCIPLES

RELATED APPLICATIONS

The present disclosure claims priority to Indian Provisional Application No. 202111031831 filed Jul. 15, 2021, and to Indian Provisional Application No. 202111038938 filed Aug. 27, 2021 and European Patent Application No. 22184678.5 filed Jul. 13, 2022, all of which are hereby incorporated in their entirety.

FIELD

The present disclosure relates generally to computer network traffic. More particularly, the present disclosure relates to a system and method for managing and prioritizing network traffic, for example, via shaping using fair-share principles, in a distributed environment.

BACKGROUND

Network operators, internet service providers (ISP), or the like (generally referred to as "ISP"), may operate or use a variety of computer networks, for example, cable networks, wireless (4G, 5G, or the like) or other networks. These networks tend to have a finite amount of bandwidth available. Subscribers registered with an ISP generally share the ISP's available bandwidth in various ways. When the total amount of bandwidth used by all the subscribers is within the limit of the bandwidth provided by the ISP, the quality of service and experience on applications is generally not impacted due to limited bandwidth available in the ISP network(s). However, when the total amount of bandwidth required by all the subscribers exceeds the bandwidth available to the ISP, the quality of experience on applications by subscribers may suffer. Under these conditions, the network can become congested as the demand for traffic is higher than the bandwidth available.

A subscriber running background traffic (for example, bit torrent, file download, or the like) may be more tolerant to lower available bandwidth, but a subscriber engaged in a video call or streaming video may notice degradation in quality of experience more quickly. This is one of the reasons to distinguish between quality of service (QoS) and quality of experience (QoE). Even though an ISP may want to provide as much bandwidth as subscribers' desire, it comes with a cost. Therefore, bandwidth shaping is often applied on the network traffic to limit the amount of bandwidth utilized by an individual subscriber and/or group of subscribers and/or specific application(s) or the like based on different criteria to try to optimize QoE and/or QoS depending on operator deployment choice. Prioritized or optimized use of bandwidth, dividing shared bandwidth among each subscriber/group of subscribers and giving preference to priority traffic during bandwidth congestion are a few examples of dividing bandwidth among subscribers.

Often an ISP will guarantee that a certain bandwidth is to be shared among a particular group, for example, a group of subscribers, a set of applications, certain locations or the like. This guaranteed bandwidth is intended to be equally distributed among active subscribers of the group irrespective of the priority and/or type of traffic being sent from the subscriber. If there are subscribers generating equal amounts of traffic, each subscriber is intended to receive an equal share of the bandwidth, even if the priority of the traffic differs from subscriber to subscriber, if the ISP has guaranteed a particular bandwidth to the individual subscribers.

However, conventional methods of working with bandwidth encounter various issues, particularly when working with distributed systems. In a distributed system, there can be a plurality of nodes handling different levels of bandwidth and a common bandwidth shaping approach can result in uneven or unfair usage of bandwidth among subscribers, applications or the like. It is therefore desirable to provide an improved method and system for managing and prioritizing (for example, via shaping) network traffic in a distributed environment.

The above information is presented as background information only to assist with an understanding of the present disclosure. No determination has been made, and no assertion is made, as to whether any of the above might be applicable as prior art with regard to the present disclosure.

SUMMARY

According to an aspect herein, there is provided a system for managing network traffic in a distributed environment, the system including: a plurality of logic modules configured to determine policy data related to bandwidth management and at least one split criteria for a basis for shaping network traffic; a control processor associated with each one of the plurality of logic modules, each control processor configured to determine data associated with each of a plurality of traffic flows at the associated logic module and to coordinate traffic actions over the plurality of logic modules; a packet processor associated with each control processor and configured to determine a traffic action based on each traffic flow and received policy data; and at least two shaper objects configured to receive a split of the traffic flows and enforce the determined traffic action on their respective traffic flow.

In some case, the policy data may include available bandwidth in the distributed environment and the available bandwidth is allocated across the plurality of logic modules based on fair split principles.

In some cases, the control processor may be configured to determine the fair split bandwidth for each of the plurality of logic modules and within each of the plurality of logic modules based on the policy data.

In some cases, the control processor may be configured to communicate the fair split bandwidth to the data processor and the data processor may be configured to create a fair child shaper object for each split at the logic module based on at least one split criteria.

In some cases, the split criteria may be selected from the group comprising: hostname, location, priority, subscriber plan, and application type.

In some cases, the control processor may be configured to determine whether an additional fair child shaper object is required based on the split criteria and the plurality of traffic flows.

In some cases, the packet processor may be configured to update a number of active splits at a predetermined interval.

In some cases, each control processor may be configured to coordinate traffic actions each of the fair child shaper objects and share the coordinated traffic actions with each control processor associated with each of the plurality of logic modules.

In some cases, the data processor may be configured to determine a borrowable pool of bandwidth from each of the at least two shaper objects.

In some cases, each of the logic nodes is configured to share the borrowable pool of bandwidth among any shaper object that requires further bandwidth.

In another aspect, there is provided a method for managing network traffic in a distributed environment, the method including: determining policy data related to bandwidth management and at least one split criteria for a basis for shaping network traffic, via a plurality of logic nodes; periodically: determining traffic flow data associated with each of a plurality of traffic nodes at an associated logic nodes; aggregating traffic flow data among the plurality of logic nodes to provide bandwidth requirements and determining a traffic action based on each traffic flow and the policy data; and splitting the traffic flows to at least two shaper objects based on the traffic action and the at least one split criteria.

In some cases, the policy data may include available bandwidth in the distributed environment and the available bandwidth is allocated across the plurality of logic modules based on fair split principles.

In some cases, the method may further include determining a borrowable bandwidth pool based on available bandwidth, bandwidth requirements and traffic flow data; communicating the borrowable bandwidth pool among the plurality of logic nodes; and configuring the at least two shaper objects at each of the logic nodes to shape traffic according to the borrowable bandwidth pool.

In some cases, the method may further include determining the fair split bandwidth for each of the plurality of logic modules and within each of the plurality of logic modules based on the policy data.

In some cases, the method may further include communicating the fair split bandwidth to the data processor; and creating a fair child shaper object for each split at the logic module based on at least one split criteria.

In some cases, the split criteria may be selected from the group comprising: hostname, location, priority, subscriber plan, and application type.

In some cases, the method may further include determining whether an additional fair child shaper object is required based on the split criteria and the plurality of traffic flows.

In some cases, the method may further include updating a number of active splits at a predetermined interval.

In some cases, the method may further include coordinating traffic actions for each of the fair child shaper objects; and sharing the coordinated traffic actions with each control processor associated with each of the plurality of logic modules.

Other aspects and features of the present disclosure will become apparent to those ordinarily skilled in the art upon review of the following description of specific embodiments in conjunction with the accompanying figures.

BRIEF DESCRIPTION OF FIGURES

Embodiments of the present disclosure will now be described, by way of example only, with reference to the attached Figures.

DETAILED DESCRIPTION

Figure 1:
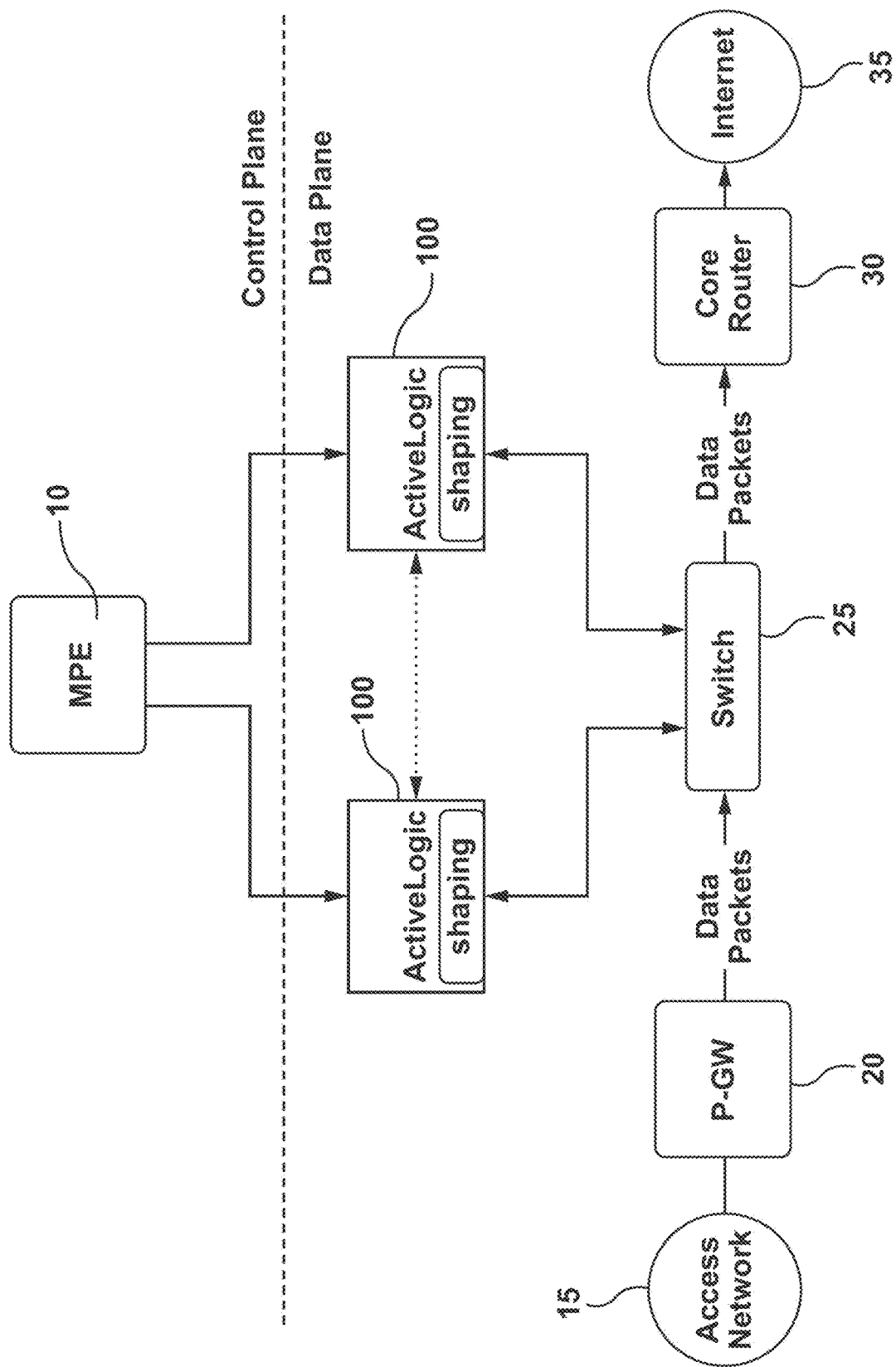
FIG. 1 illustrates an environment for a system for prioritizing network traffic according to an embodiment.

Generally, the present disclosure provides a method and system for prioritizing network traffic via shaping over a plurality of distributed nodes. In particular, shaping or traffic prioritization may occur over more than one system in a network. Embodiments of the system and method detailed herein are intended to monitor traffic flow and coordinate shaping of the traffic flow based on priority of the traffic over distributed systems. In some cases, the system may determine traffic flow data for the traffic flow received at each of the nodes within the distributed system. Each node may communicate with each of the other nodes at a predetermined synchronization interval, which may include "real time" or near "real time" to determine the overall makeup of the traffic flow. Each node, based on the overall traffic flow, can then be configured to shape and prioritize the traffic flow through the node in conjunction with the traffic flowing through the other nodes. In some cases, the method and system are intended to use fair-split principles to allocate the bandwidth between subscribers.

It will be understood that there may be difficulties and benefits to provide shaping in a distributed environment ("distributed shaping"). Whereas Quality of Service (QoS) based shaping may generally provide a fairer share of bandwidth, it may not always provide a fair share of Quality of Experience (QoE). For example, if all subscriber's bandwidth is reduced by 10%, video call users may have visibly bad experience compared to file download users who may not notice the downgrade as much. An ISP may be able to provide better QoE by providing more bandwidth, but additional bandwidth comes with associated cost. The network bandwidth can be used in a more optimal way if QoE is taken into consideration during prioritization with the goal that, during congestion, the QoE of subscribers for each application or category of application (for example, social media, streaming, downloading, and the like) is kept at a predetermined level that is considered to be good or within an acceptable limit of degradation.

In some cases, embodiments of the system and method provided herein are intended to prioritize certain types of traffic over others, shaping can be performed in a distributed manner such that traffic tagged with certain priority is given precedence over other lower priority traffic. Bandwidth is allotted to traffic tagged with higher priority when demanded but if the demand for bandwidth of higher priority traffic is low, spare bandwidth can be allotted to lower priority traffic. Such type of shaping is referred to as Priority Shaping. Further, in order to make sure that lower priority traffic does not starve due to high load of priority traffic, weights can be assigned to priorities and allow for minimum guaranteed bandwidth to each priority traffic. This process is generally referred to as Weighted Fair Queue shaping.

Fair-split shaping is designed to maximize network utilization while ensuring congestion management is transparent if there is no congestion. In subscriber fair-split shaping, an equal portion of the available bandwidth of the network is given to each active subscriber. Unused bandwidth may be made available to the rest of the subscribers on that network segment. Fair-split shaping is intended to prevent heavy users from negatively impacting the quality of experience of other subscribers. In some cases, fair-split shaping may be incorporated with weighted factor groups or tiers and/or may also be application aware.

In a non-distributed environment, Shaper Objects, sometimes referred to as shapers, are generally aware of the total available bandwidth, traffic for different priorities and their respective bandwidth demands. In this case, Shaper Objects are intended to iterate over all the priorities and allocate available bandwidth to traffic in the order of precedence of priority and corresponding demand. In conventional distributed environments, Shaper Objects tend to operate individually, in that each Shaper Object will shape whatever traffic flows through the Shaper Object based on the rules assigned to that Shaper Object.

In the following description, it can be useful to consider the following general definitions:

- Host: an individual station which is a source of traffic which has a unique IP address;
- Shaper Object: a logical entity that holds information required to perform shaping on traffic received. This information can include but is not limited to bandwidth available per priority, bandwidth utilized per priority;
- Parent Shaping Object: a logical unit that describes the available bandwidth that is shared among a set of logical units, which are called fair child objects of this parent shaping object and criteria to divide available bandwidth among the child logical units;
- Fair Child Shaping Object: a logical entity that is related to a Parent Shaping Object and the associated bandwidth. A fair child shaping object can be created based on the criteria through which a parent shaping object divides its bandwidth. For example: if the criteria to distribute Parent Shaping Object's bandwidth is "host", for each host, at least one Fair Child Shaping Object can be created and a parent shaping object can be used fairly among all Fair Child shaping objects. Other criteria could be location, connection, and the like, as detailed herein;
- Active Fair Child Object: a Fair Child Shaping object that is seeing input traffic in an interval can be denoted as active fair child objects. Generally, total Active Fair Child Objects are determined across a cluster or the like;
- Excess Demand for Fair Child Object: Each fair child shaper object is allocated a bandwidth for an interval that is allowed to be forwarded. The amount of traffic seen in over this allocated bandwidth is denoted as excess demand bandwidth;
- Logic node or Logic module (sometime referred to as "ActiveLogic" nodes or "ActiveLogic" modules): an entity that receives traffic from various hosts, identifies the appropriate shaper object to which the traffic should be subjected. Once shaping is performed, the Logic module handles (for example, transmits, holds, drops or the like) the packets according to shaping result;
- Cluster: a collection of two or more Logic nodes working together, which may include any predetermined number of nodes;
- Data Processor: a module (generally software or a combination of software and hardware) in an Logic node that receives, shapes, and transmits traffic. A Shaper Object in the Data Processor collects various statistics and data regarding per priority traffic received and transmitted for an interval, which is shared with a Control Processor periodically. The Shaper Object is generally also informed about how much bandwidth can be utilized for a next interval by the Control Processor;
- Control Processor: a processing module or engine that determines the available bandwidth for shaper objects within the current Logic node based on the information received from the Data Processor and other Control Processors in a cluster. The Control Processor also sends local information to other Control Processors operating in the cluster;
- Sync Interval: an interval (typically in the range of milliseconds or the like) within which, each Control Processor in the Logic nodes communicates the information about traffic statistics to other Control Processors in other Logic nodes, and determines bandwidth to be used by the local shaper object;
- Minimum Guaranteed Bandwidth (MGB) of Fair Child Object: a Fair claim of the Fair Child Shaping Object to the bandwidth of Parent Shaping Object. For example: if 100 Mbps is the parent shaper bandwidth and there are 10 Fair Child Shaping objects, Minimum Guaranteed Bandwidth of each Fair Child Object may be set to 10 Mbps. In addition, if a Fair Child Object is receiving traffic at a plurality of Logic Nodes, the Minimum Guaranteed Bandwidth at a given Logic Node may be a percentage allocation of bandwidth for that shaper at a local Logic node. The term guaranteed is used in the sense that this should be the minimum in a "fair" situation;
- Minimum Guaranteed Bandwidth (MGB) of Parent Object: The sum of Minimum Guaranteed Bandwidth of all Fair child shapers at a given Logic Node;
- Excess Demand for Parent Object: The total demand for a Parent shaper object at a given Logic Node is a sum of the demands of fair child objects at that node, when total demand for a parent shaper object is higher than Minimum Guaranteed Bandwidth of the parent object in an interval, then the difference of the two demands is known as Excess Demand for parent object; and
- Spare Bandwidth for Parent Object: The total demand for a Parent shaper object at a given Logic Node is a sum of the demands of fair child objects at that node, when total demand for a parent shaper object is less than Minimum Guaranteed Bandwidth of the parent object in an interval, then the difference of the two demands is known as Spare Bandwidth for parent object.

FIG. 1 illustrates an environment for an embodiment of the distributed system 100 detailed herein. As seen in FIG. 1, network traffic flows from an access network 15, through a packet gateway 20 to a switch 25. The switch 25 may then route traffic to and from the distributed system 100 based on the network configuration. The prioritized and shaped traffic is sent to the core router 30 and the Internet 35. It will be understood that traffic flowing from the Internet 35 to the Access Network 15 will generally traverse the same elements in opposite order.

Figure 2:
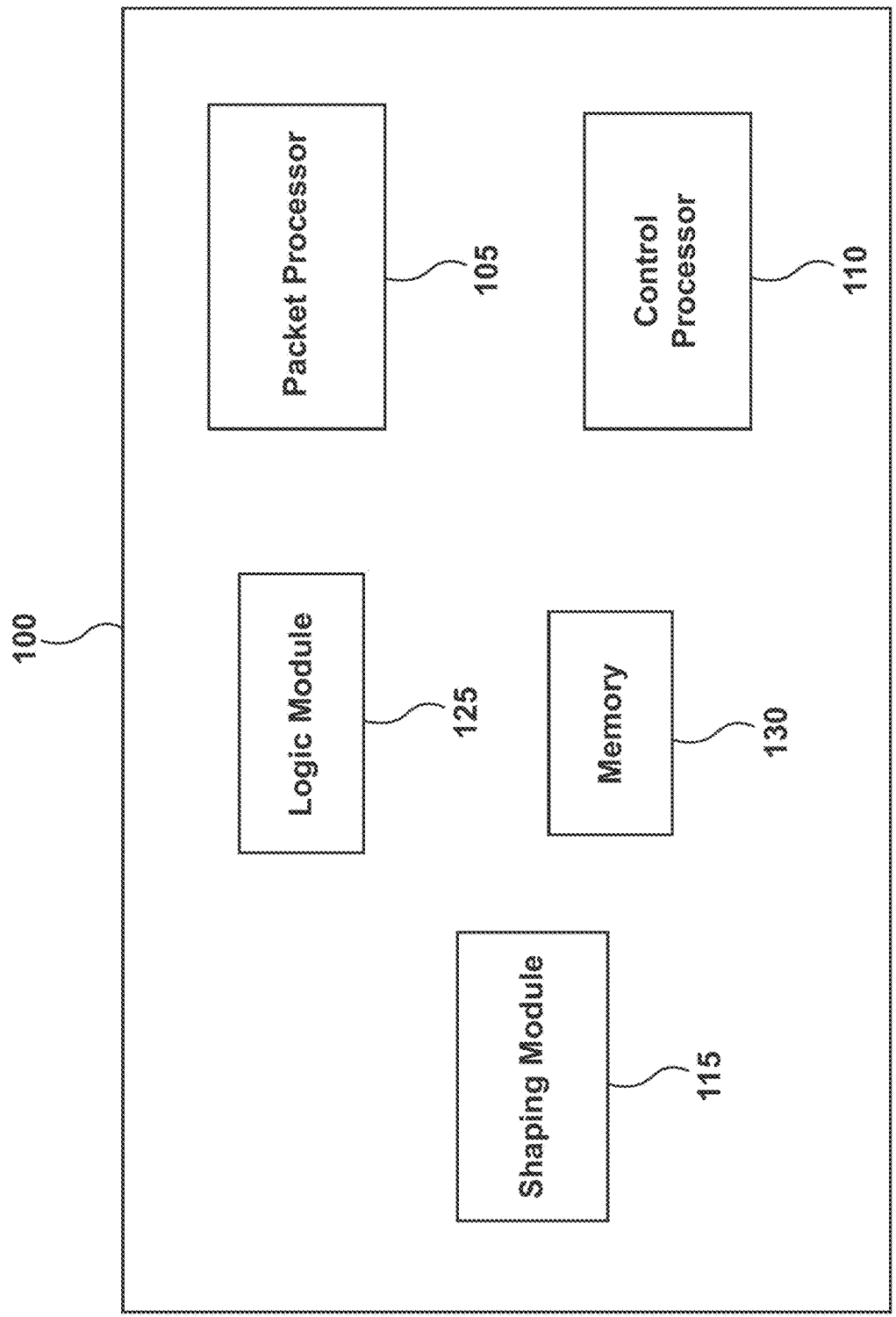
FIG. 2 illustrates a system for prioritizing network traffic via distributed shaping according to an embodiment.

FIG. 2 illustrates an embodiment of an element of a distributed system 100 for prioritizing network traffic in a distributed environment. As detailed herein, embodiments of the system 100 are intended to include a Logic module 125, which is operatively connected with a Policy Engine (PE 10). The Logic module may be an inline data plane element responsible for shaping traffic appropriately based on operator policies and product configuration. The PE 10 is intended to be a control plane element with knowledge of subscriber mapping to traffic flows and may also provision shaper parameters to the system.

In the case of a distributed environment, there may be a plurality of Logic modules or nodes placed around the network in a distributed manner. A set of N Logic module nodes (sometimes call logic modules or logic nodes) serving traffic and performing shaping in the network, is generally referred to as a cluster. Conventionally, traffic is distributed to individual Logic nodes and each Logic node allocates its share of the bandwidth to traffic processed by them without knowledge of the traffic or distribution of other Logic nodes. To achieve the behavior of Priority Shaping and Weighted Fair Queue Shaping as explained above, it is generally better to have appropriate distribution of the available bandwidth among all of the Logic nodes in the cluster.

Embodiments of the system and method detailed herein are intended to achieve priority and weighted fair queue shaping in a cluster/network, such that across the cluster/network each priority traffic is configured to receive a share of the bandwidth according to weights assigned to the cluster/network. If no weights are assigned then demands can be fulfilled according to priority level of the traffic.

As noted above, FIG. 2 illustrates an embodiment of an element of a distributed system 100 for prioritizing network traffic in a distributed environment. The system includes a packet processor 105, a control processor 110, a shaping module 115, a logic module 125 and at least one memory component 130. The system may include a plurality of these elements 100, each having its own similar modules and components. The system is generally intended to be distributed and reside in the data plane. A central processing unit or the control processor may be configured to execute the instructions stored in the memory component in order for the modules to execute their functions. The system 100 is intended to receive information from the computer network equipment that allows the system to determine policy rules and prioritization rules for the network.

The Logic node or Logic module 125 refers to an entity that receives packets from the traffic flow, identifies an appropriate shaper object for the traffic flow associated with the packets. Once shaping is performed, the Logic module 125 processes the packets according to a shaping result.

The Shaper module 115 or Shaper object is a logical entity that holds the information required to perform shaping on the traffic received. This information includes, for example, bandwidth available per priority, bandwidth used per priority, and the like.

The Packet Processor 105 may be associated with the Logic module 125 and is configured to provide the instructions for shaping and processing the traffic flows. The Shaper Object 115 associated with the Packet Processor 105 collects various statistics and data regarding, for example, the priority of the traffic flows received and transmitted for an interval. This data is shared with the Control Processor 110 periodically. At this interval, the Shaper Object 115 may also be informed about how much bandwidth can be used for next interval. In some cases, the Packet Processor 105 may also include a Traffic Classification Engine (not shown). The Traffic Classification Engine is configured to classify traffic, for example, by application. In some cases, the Packet Processor is configured to determine or retrieve shaping rules based on the traffic application type or other traffic classification criteria.

The Control Processor 110 may generally refer to a processing module that determines the available bandwidth for shaper objects within the current node based on the information received from the Packet Processor 105 and other Control Processors 110 in the cluster. The Control Processor 110 also sends the local information to all the other Control Processors 110 operating in the cluster. The Control Processor 110 is intended to operate the Logic module 125 of the system in connection with the Packet Processor 105.

A Sync Interval is intended to be a predetermined interval in, for example, milliseconds or other appropriate period, within which, the Control Processor 110 associated with a Logic node 125 communicates gathered data about traffic flow data to the Control Processors 110 of other Logic modules 125 in the cluster. This traffic flow data is intended to be used to determine bandwidth to be used by each shaper object locally. The Sync Interval may be preconfigured in each of the nodes in the cluster. The Sync interval is generally intended to be the same in each node but may be different in different nodes based on, for example, use of each node or the like.

Figure 3:
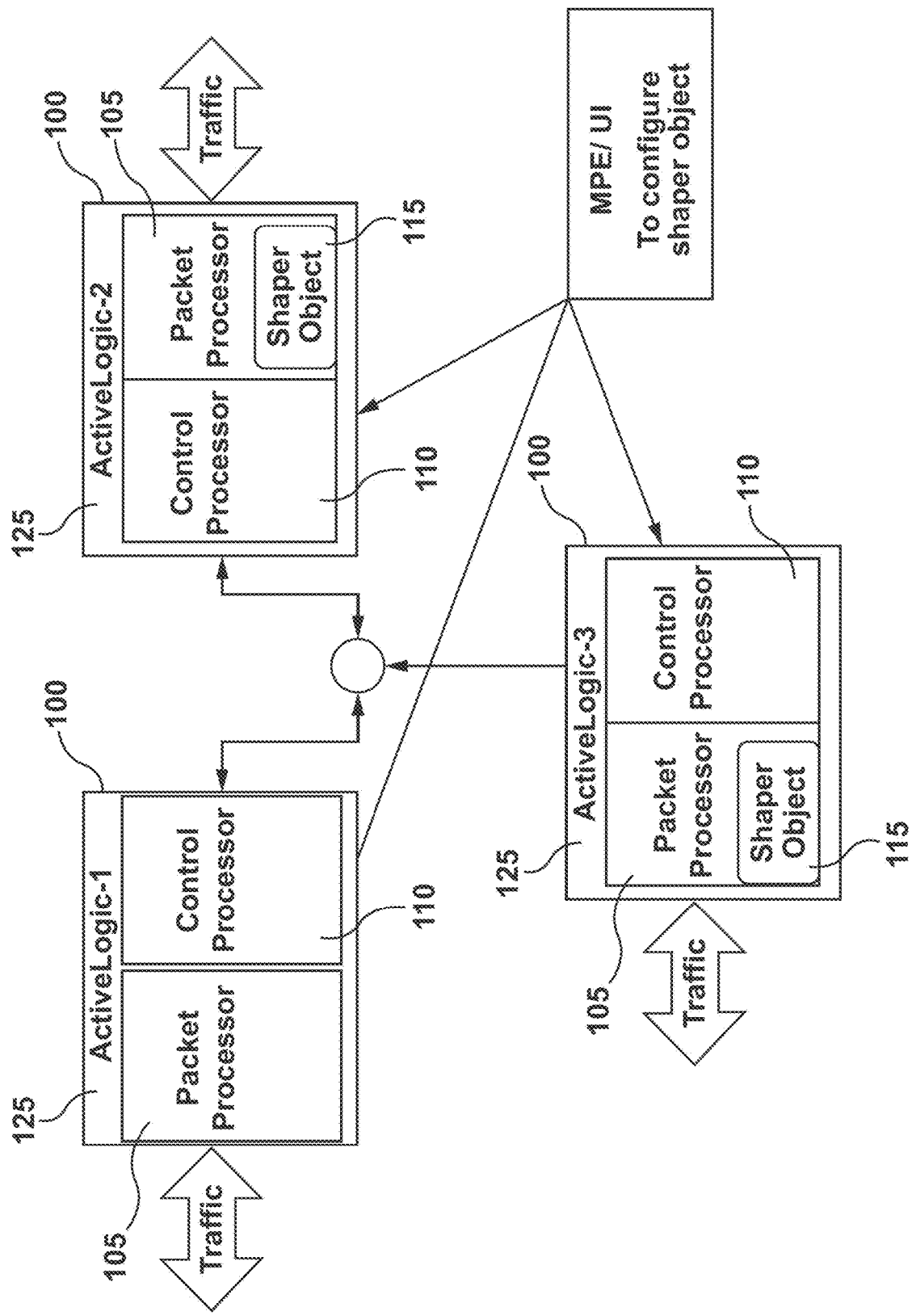
FIG. 3 illustrates a plurality of systems for prioritizing network traffic via distributed shaping according to an embodiment.

FIG. 3 illustrates a system diagram showing distributed network nodes. Each Logic module 125 may include or be operatively connected to at least one Data Processor 105 (sometimes referred to as Packet Processor) and at least one Control Processor 110. In some cases, an administrator of the system or of the ISP may configure a shaping object with desired expected behavior (for example: a rate at which traffic to be shaped, weights per priority, rules to identify traffic that should be subjected to Shaper Object 115, or the like). This configuration may be parsed by the at least one Control Processor 110 and sent to the at least one Packet Processor 105.

The Packet Processor 105, when it receives traffic, can assign priority to the traffic based on the rules configured by the control plane or policy engine, and selects at least one Shaper Object 115 that is intended to shape the traffic. The selected Shaper Object 115 may be allocated with bandwidth to spare in an interval. The Shaper Object 115 is configured to maintain queues per priority and incoming traffic is queued in respective priority buckets. The Shaping Object 115 periodically drains the queues starting from the highest priority and allocates the available bandwidth based on the traffic packets in the queue.

Once an interval is over the traffic data, for example, the amount and priority of the traffic and other traffic flow data and statistics, collected by the shaper object are passed to the Control Processor 110. The Control Processor 110 then propagates this data to all the Logic nodes in the cluster. The Control Processor 110 may aggregate the information received locally as well as received from the other elements in the system in the distributed environment to determine bandwidth that can be allocated by local Shaper objects 115 per priority and update the Shaper object 115 via the Packet Processor 105.

In some cases, the traffic statistics collected may be, for example, per priority traffic demand in that node over an interval for the Shaping object, per priority used bytes in the node over the interval for the shaping object. or the like. In some cases, other traffic statistics, for example, application type, subscriber details or the like, may also be determined and collected.

Figure 4:
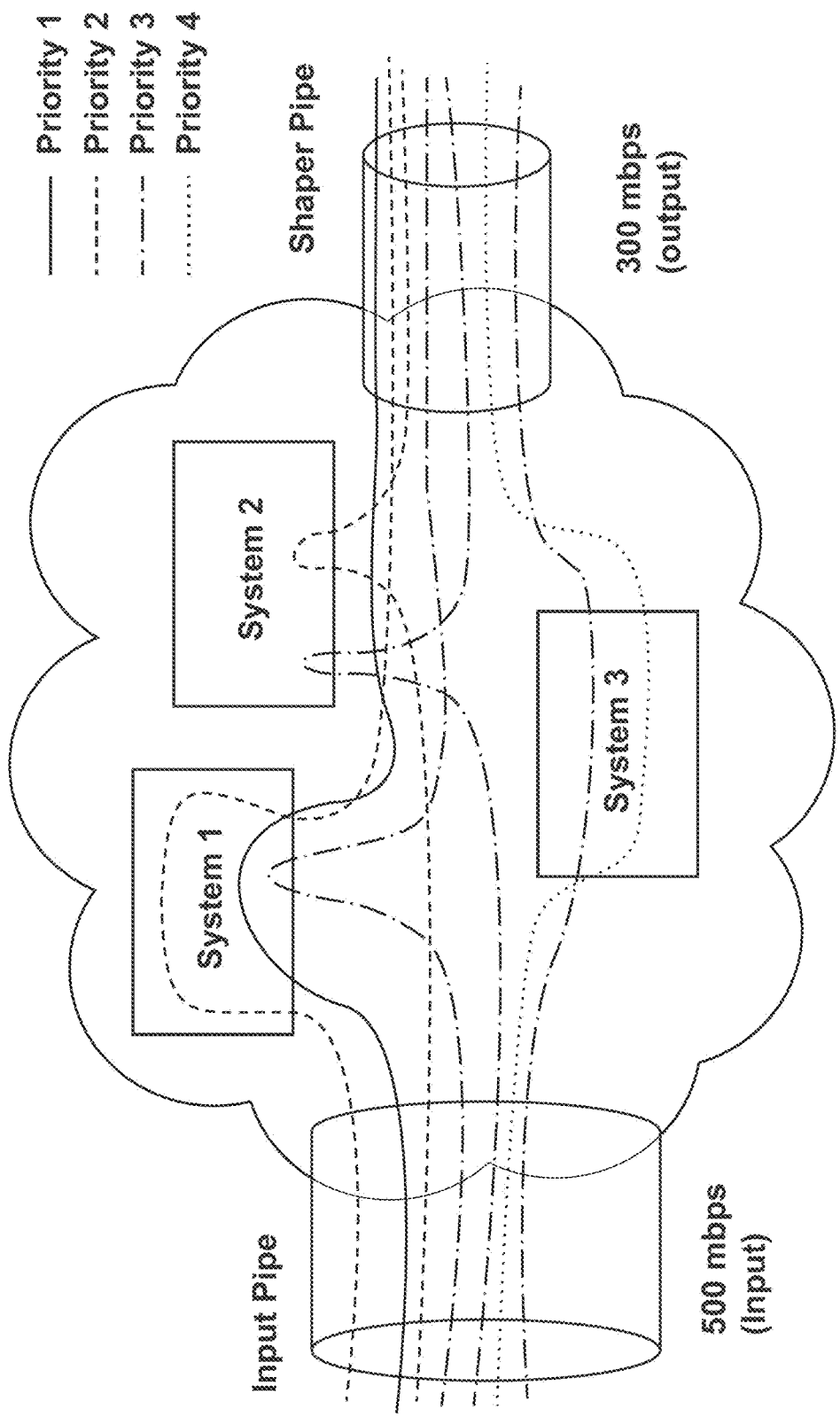
FIG. 4 illustrates traffic flow through a plurality of distributed shapers.

FIG. 4 illustrates an example of a distributed shaping system with various levels of priority traffic flows. Traffic flows of varying priorities may be received at each distributed system. Embodiments of the system and method are intended to output the traffic and subject it to an appropriate shaper object. As can be seen from FIG. 4, traffic flows of the same priority may flow through various nodes of the system, such that more than one node in a cluster may see the same priority traffic.

In a particular example, the system may be configured to shape traffic at the rate of 300 Mbps and may operate in a cluster with 3 systems for distributed shaping, which implies that the cluster will allow a maximum 300 Mbps traffic at any given point of time. If the input is more than 300 Mbps, for example 500 Mbps, the remaining 200 Mbps traffic may be dropped in a conventional solution. Further, in a conventional solution, each shaper object may be configured to shape its local input, based on its locally received traffic priority. This conventional solution may not provide appropriate priority traffic flow as a whole as each shaper object only reviews the local data. In particular, Shaper 1 (S1): 250 Mbps (P1 150, P2, 50, P3 50) 50%, while, Shaper 2 (S2): 140 Mbps (P2 80, P3 60) 28% and Shaper 3 (S3): 110 Mbps (P3 10, P4 100) 22%. In a conventional system the bandwidth will be divided based on total input demand per system (without considering priority view in cluster level). Therefore, for the above example, S1: 50% of 300==150 Mbps (P1=150, P2=0, P3=0)
S2: 28% of 300==84 Mbps (P2=80, P3=4)
S3: 22% of 300==66 Mbps (P3=10, P4=56)

It can be seen, that in a conventional solution, the shaper objects may drop P2 traffic while allowing P3 and P4 traffic.

Embodiments of the system and method are intended to review all the traffic priority to allow for higher traffic priority to flow with less shaping than lower priority traffic. In this example, traffic may be categorized in 4 priorities, and the traffic is received at each node as per following description:

Shaping bandwidth: 300 mbps
Incoming traffic at system 1—Traffic P1 with 150 mbps, Traffic P2 with 50 mbps, Traffic P3 with 50 mpbs
Incoming traffic at system 2—Traffic P2 with 80 mbps and Traffic at P3 with 60 mbps
Incoming traffic at system 3—Traffic P3 at with 10 mbps and traffic P4 with 100 mpbs.

Generally, the expected result may be in the cluster the system detects 150 Mbps Priority 1 traffic (in system 1), 130 Mbps Priority 2 traffic (in system 1 and system 2), 120 Mbps priority 3 traffic (in system 1, system 2 and system 3) and 100 mbps Priority 4 traffic (in Node C). Thus the overall input is seen as a total of 500 Mbps.

Figure 5:
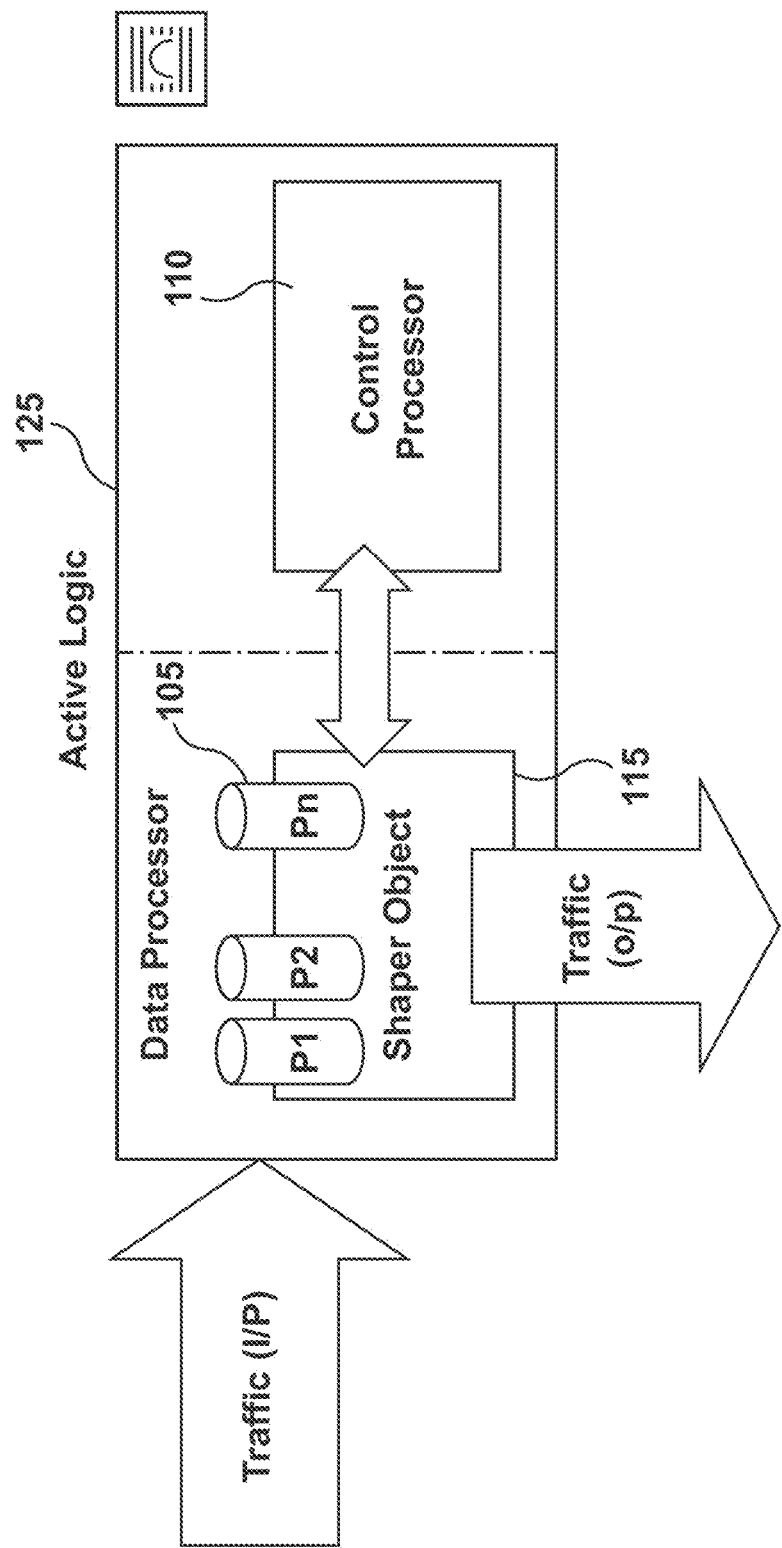
FIG. 5 illustrates a traffic flow through a system for prioritizing network traffic via distributed shaping according to an embodiment.

It will be understood that the bandwidth may be shared between system 1, system 2 and system 3 in the following manner:

Logic-1 module: (Total Output: 209 Mbps)
  Priority-1 traffic: Shaped at 150 mbps
  Priority-2 traffic: Shaped at 50 mbps
  Priority-3 traffic: Shaped at 9 mbps
  Drops: 41 Mbps
Logic-2 module: (Total Output: 91 Mbps)
  Priority-2 traffic: Shaped at 80 mbps
  Priority-3 traffic: Shaped at 11 mbps
  Drops: 49 Mbps
Logic-3 module: (Total Output: 0 Mbps)
  Priority-3 traffic: 0 Mbps output
  Priority-4 traffic: 0 Mbps output FIG. 5 illustrates an example of traffic flow and processing at each system within the cluster. An Operator may initially configure the Shaper Object 115 to shape traffic at a certain rate using a policy engine (a control plane element) or a User Interface associated with at least one Logic module 125, or it may be preconfigured with various parameters. In some cases, the configurable parameters may be, for example: a rate at which traffic is to be shaped per second, per priority weights in percentage, the Sync Interval, rules to match the traffic that should be sent to each shaper object, rules to assign priority to the traffic that should be sent to shaper object, and the like.

Once the shaper is configured with initial parameters, the Control Processor 110 at each system logic node sends the configuration to the Packet Processor 105. The Packet Processor 105 may create a logical entity for the Shaper Object 115 with the respective configuration. In some cases, the Shaper Object may already be created and may be updated with the respective configuration. Once the Shaper Object 115 is created, the Packet Processor 105 may send matching traffic to the Shaper Object 115, which will perform the shaping.

The Sync Interval can be a configurable parameter, which can be fine-tuned to provide for accurate and/or updated results in various traffic conditions. If the traffic flow is relatively stable, a 1 second interval may be sufficient. On the other hand, if the traffic is constantly varying a more aggressive synchronization interval, for example, 100 millisecond may be used. It will be understood that this parameter may also be updated from time to time or in real-time based on the traffic conditions.

In some cases, there may be a Shaper Object without Weighted Fair Queue Configuration. If a shaper is configured without any weights per priority, by default the shaper object may be set to allocate all the bandwidth to highest priority traffic. If demand for highest priority traffic doesn't consume all the bandwidth, it will be consumed by second highest priority and so on.

Figure 6:
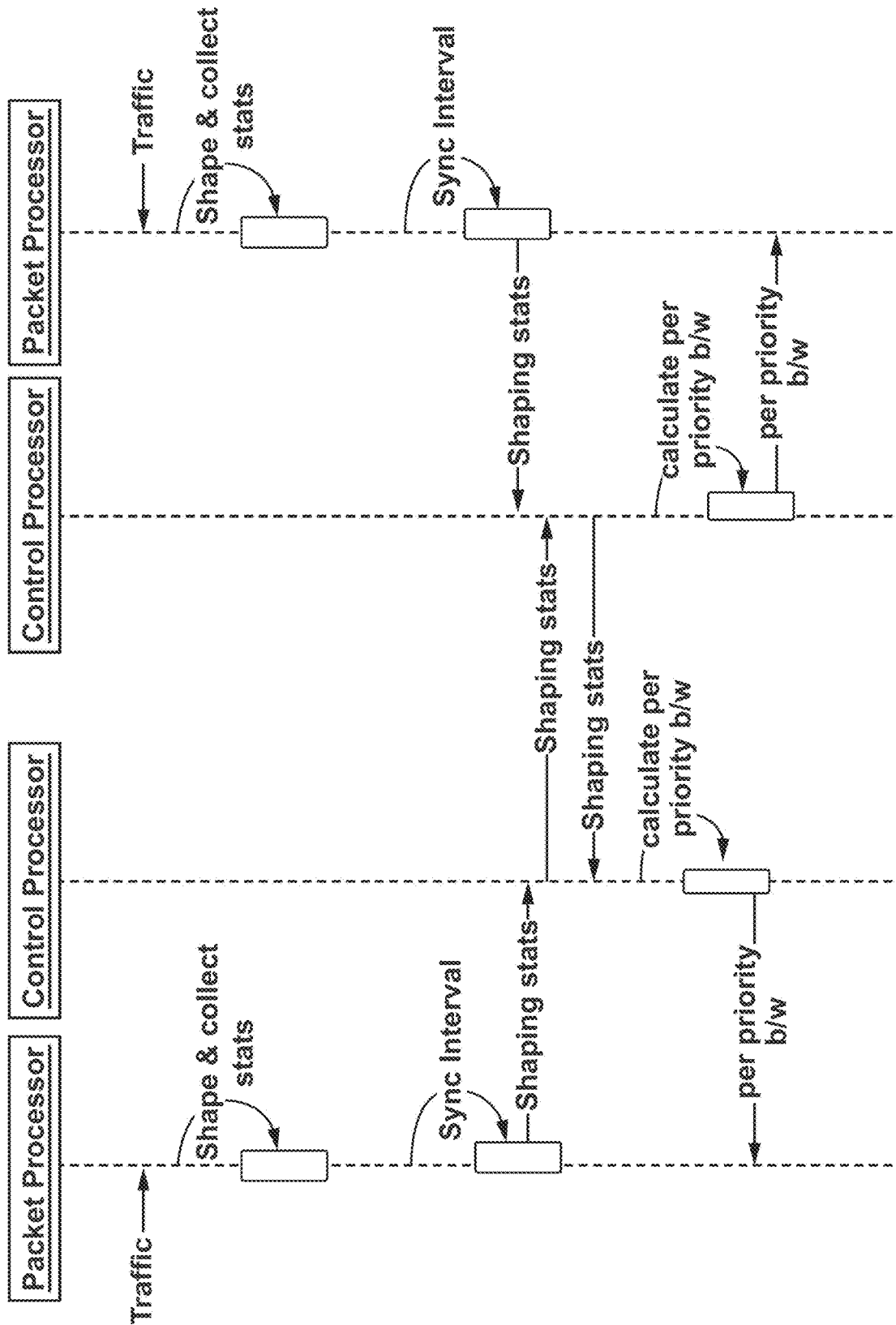
FIG. 6 is a sequence diagram for a method for prioritizing network traffic via distributed shaping according to an embodiment.

FIG. 6 illustrates a sequence diagram of an embodiment of a method for shaping in a distributed environment. The Control Processor 110 may initially allocate 100% of the configured bandwidth to the Shaper Object 115 at each Logic module 125. When traffic is received at the Logic module, the Packet Processor 105 associated with the Logic Module is configured to parse the traffic. The Packet Processor 105 may determine if the traffic should be processed by a shaper object 115. If yes, then the packet processor 105 may further determine the priority of the traffic. Once the shaper object 115 and traffic priority is determined, the Packet Processor 105 may queue the packets to the respective priority queue of the identified shaper objects. The traffic priority may be determined based on a traffic classification engine and configured shaping rules. If, for example, there is a shaping rule to give video streaming traffic the highest priority, then if the traffic flow is classified as video streaming traffic from the traffic classification engine, then the shaping object will mark the traffic flow as the highest priority and apply the highest priority rule. In some cases, the traffic classification engine may be part of the packet processer.

At every sync interval, the shaper object 115 may iterates through each priority queue in the order of precedence (highest priority to lowest priority) and may distribute the available bandwidth demanded by each until all priorities are traversed or the available bandwidth is fully consumed. During this process, the Logic module may determine demands per priority. At the end of the interval, the collected data may be sent to or retrieved by the Control Processor, for example, as follows where $P_i$ is the $i^{th}$ priority statistics for the shaping object:

Message: Shaper_Utilization_Details

From: Shaper Object

To: Control Processor

Contents:

| P1: demand | P2: demand | P3: demand | ... | ... | ... | Pn: demand |
|---|---|---|---|---|---|---|

The Control Processor 110 may be configured to have this information stored in a local memory component. The Control Processor 110 may also forward this information to all other Control Processor modules operating in Logic modules of the cluster over, for example, UDP protocol or the like. It is intended that each control processor 110 will then have traffic data for its associated logic module as well as traffic data for each of the other logic modules in the cluster.

For every Sync Interval, the Control processor 110 is configured to read and store the per priority demand received from all the Control Processors 110 in the cluster. Each Control Processor in the cluster may determine the bandwidth that can be allocated to a shaper object, which can be consumed until the end of the next Sync Interval. Each shaper object at each Packet Processor running at each of the plurality of Logic modules may be given a specific bandwidth allocation based on the priority of the traffic seen by the shaping object in the previous Sync Interval. The bandwidth per priority for the associated local Logic module may be sent to the Packet Processor 105 where the shaper object 115 will use them to shape the traffic:

Message: Shaper_Allocation_Details

From: Control Processor

To: Shaper Object

Contents:

| P1: Bandwidth | P2: Bandwidth | ... | ... | Pn: Bandwidth |
|---|---|---|---|---|

Figure 7:
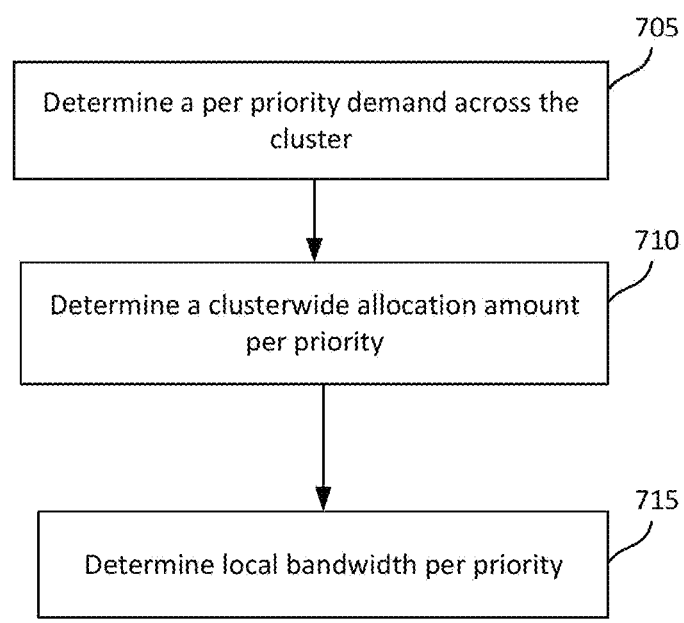
FIG. 7 is a flowchart for a method for prioritizing network traffic via distributed shaping according to an embodiment.

FIG. 7 illustrates a method for shaping in a distributing environment according to an embodiment. At 705, the system determines the per priority demand across the cluster by aggregating (for example, by summing) the traffic flow data received from each Logic module at each control processor 110. Each local shaper object is configured to determine and store traffic flow data including bandwidth requirements and priority level of traffic flows associated with the shaper object.

At 710, the Control processor is configured to determine a clusterwide allocation amount for each priority level. In particular, the control processor 110 may determine a clusterwide bandwidth to spend for an interval across cluster using for example: total_Interval_bw=(configured_bandwidth/1000)*interval. Further, a clusterwide allocation of the per priority bandwidth for each priority, from highest to lowest priority, using for example:

If (total_Interval_bw > clusterwide_priority_demand
( determined at 705 ) )
then
priority_X_interval_bw = total_Interval_bw - clusterwide_priority_demand
total_Interval_bw = total_Interval_bw - priority_interval_bw
else
priority_X_interval_bw = total_Interval_bw At 715, each local control processor 110 may determine local bandwidth per priority using, for example: (local_demand_for_priority/total_demand_across_cluster)*priority_X_interval_bw. It will be understood that this may be the calculation when no weights have been assigned per priority. Each control processor 110 is configured to have the same traffic flow data and is configured in a similar manner in that each control processor 110 in a cluster will determine the flow per each local Logic node based on the overall distributed bandwidth and overall distributed traffic flow data. Pseudocode of the method shown in FIG. 7 is detailed below.

Figure 8:
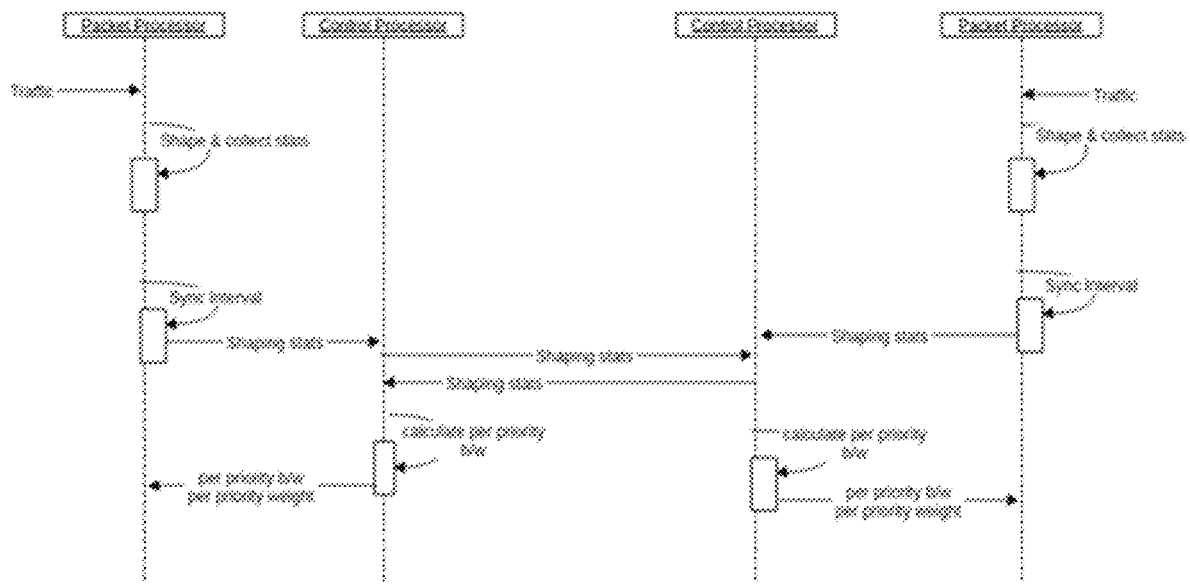
FIG. 8 is a sequence diagram for a method for prioritizing network traffic via distributed shaping according to another embodiment.

For Each Logic Control Processor
- Collect the per priority (P6i, P7i, P8i . . . ) input at local Node and send this information to each Node in thee cluste
- Receive per priority input information at local Node from all the Nodes in the cluster
//Calculate priority wise b/w demand across cluster
Sum(PX) = PXi + PXj + PXk . . . where X is priority and i,j, k .
are Node instances
//Calculate total Priority traffic that can be satisfied throughout cluster
Available_BW = total_Interval_bw
for x in all Priority
do
    Px = Available_BW - Sum(Px) > 0 ? Sum(Px) : Available_BW
    Available_BW = Available_BW - Px
Done
//Calculate local bw for next interval
For all Px > 0
do
    next_budget_X += (Px_local/Sum(Px) )*(Px)
done In a further example, FIG. 8 illustrates a sequence diagram for a method for distributed shaping for a Shaper Object with Weighted Fair Queue Configuration, according to an embodiment. When a shaper is configured with weights per priority, the shaper is configured to use such weights and the sum total of all weights is intended to be 100%. It is possible to configure 0% as weights for some priorities as long as 100% weights are configured among other priorities. In this example, the Shaper Object may be configured to maintain the allocation for a given priority as per the weight's configuration. In case demand for a priority is less than the weight configured, the spare bandwidth may be distributed to the other priorities where demand is more than their respective configured weights. If spare bandwidth is still available (due to, for example, low demand), remaining bandwidth may be allocated to all priorities in precedence of weights.

In this example, the Control Processor 110 may initially determine a bandwidth to each priority based on the configured weight and rate for a sync interval and may store and update each Shaper Object 115 at each local and associated Logic module 125. When traffic is received at the Logic node, the Packet Processor 105 associated with the Logic node 125 may parse the traffic. The Packet processor 105 may determine if the traffic should be processed by a shaper object. If yes, then the Packet Processor 105 may determine what the priority may be of the traffic. Once the shaper object 115 and traffic priority is determined, the Packet Processor 105 queues the packets to the respective priority queue of identified shaper objects.

At every sync interval, the shaper object 115 may iterate through each priority queue in the order of precedence (for example, from highest priority to lowest priority). The shaper object 115 may drain the queue based on per queue allocation updated by the control plane. During this time period, the Logic module 125 determines the demands per priority. At the end of interval, the collected traffic flow parameters may be sent to Control Processor 110.

Message: Shaper_Utilization_Details
From: Shaper Object
To: Control Processor
Contents:

| P1: demand | P2: demand | P3: demand | ... | ... | ... | Pn: demand |
|---|---|---|---|---|---|---|

The Control Processor 110 may be configured to store this information, for example, locally in a memory component, and may forward the information to each of the other Control Processor operating associated with Logic modules of the cluster via, for example, UDP protocol.

For every Sync Interval, the Control processor 110 may read and store the per priority demand received from each of the Control Processors 110 in the cluster. Each control processor 110 may determine the bandwidth that can be allocated to the shaper object at Packet Processor 105 running and the new weights per priority to be used by at this Logic. Bandwidth per priority for local Logic module and new weights per priorities may be sent to the Packet Processor where the shaper object will use them to shape the traffic:

Message: Shaper_Allocation_Details
From: Control Processor
To: Shaper Object
Contents:

| P1: Bandwidth, weight | P2: Bandwidth, weight | ... | ... | Pn: Bandwidth, weight |
|---|---|---|---|---|

Figure 9:
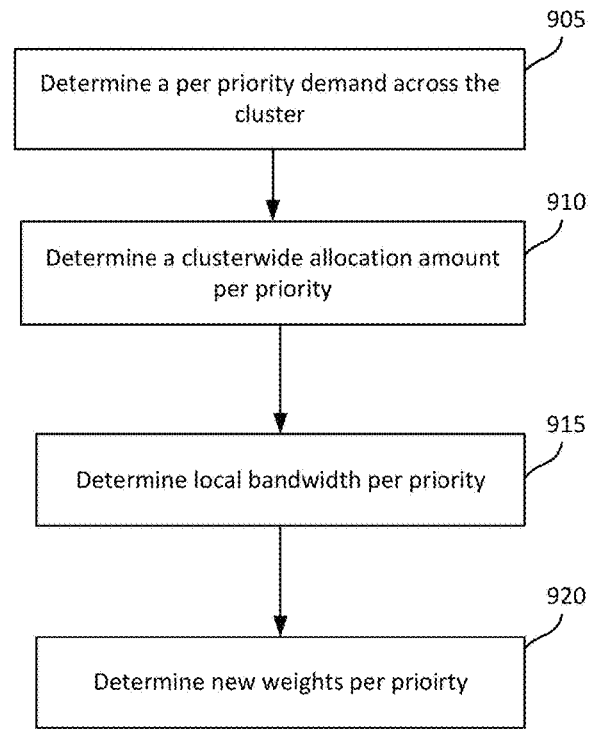
FIG. 9 is a flow chart for a method for prioritizing network traffic via distributed shaping according to another embodiment.

FIG. 9 illustrates another embodiment of a method for prioritizing network traffic via shaping using weighted queue priority in a distributed environment. At 905, the control processor may determine the per priority demand across the cluster by aggregating (for example, by summing) the information received by each Logic including what may be received from the local Shaper Object.

At 910, the control processor may determine a clusterwide allocation for each priority. First, the control processor may determine a clusterwide bandwidth to spend for an interval across cluster using, for example: total_Interval_bw=(configured_bandwidth/1000)*interval. The control processor 110 may then determine clusterwide bandwidth to spend for an interval across cluster for each priority according to configuration, by using for example: interval_bw_prio_x=(total_Interval_bw*weight_x)/100. Further, the total spare bandwidth (total_spare_bw) across the cluster that was not spent by priorities due to low demand may be determined. The Control Processor may also determine any unfulfilled demand per priority (excess_demand_x) (dropped traffic for priority due to unavailability of the bandwidth for that priority). The Control processor 110 may also allocate the spare bandwidth to priorities where demand was more than its allocated bandwidth. This may be done as follows:

interval_bw_prio_x=interval_bw_prio_x+Min (excess_demand_x, total_spare_bw)
total_spare_bw=total_spare_bw−Minimum (excess_demand_x, total_spare_bw)

If spare bandwidth is still available, each Control Processor 110 may distribute this to priority according to weights configured for them.

interval_bw_prio_x=interval_bw_prio_x+ total_spare_bw*weight_x/100
total_spare_bw=total_spare_bw− total_spare_bw*weight_x/100

At 915, the control processor 110 may be configured to determine local bandwidth per priority at local node and total bandwidth at local node using for example:

local_bw_prio_x=(local_demand_for_priority_x/total_demand_across_cluster)*interval_bw_prio_x
net_local_bw=net_local_bw+local_bw_prio_x.

Further, at 920, the control processor 110 may determine new weights per priority (based on new allocation per priority) using for example: New_weight_for_X=(net_budget_for_prio_X/total_net_budget)*100.

In particular, if a priority does not have sufficient traffic flow to consume the full weight of the bandwidth associated with the priority, the excess bandwidth is intended to be provided to the other priority levels. A specific example of the possible pseudocode is shown below.

```
For each Logic Control Processor
//Calculate priority wise b/w demand across cluster
Sum(PX) = PXi + PXj + PXk where X is priority and i,j, k .
are Logic instances
// Calculate clusterwide available bandwidth for each priority
For X in priorities
do
    weighted_allocation_for_prio_X = (total_interval_bw * weight)/100
done
//Calculate unutilized bandwidth
Spare_bw = 0
For X in priorities calculate
    Spare_bw = Spare_bw + Max ( weighted_allocation_for_prio_X −
    Sum(PX), 0)
//Calculate bandwidth demand in addition to configure bandwidth
extra_demand_for_prio_X = 0
For X in priorities calculate
    extra_demand_for_prio_X = Max ( Sum (Px) −
    weighted_allocation_for_prio_X, 0)
//Allocate the spare bandwidth to priorities where
demand is more then configured/
Adjust the configured allocation if demand is weak
While (Spare > 0 and all priorities are traversed)
do
    extra_alloc = Min ( extra_demand_for_prio_X, Spare_bw)
    Spare_bw = Spare_bw − extra_alloc
    if (extra_alloc > 0)
    weighted_allocation_for_prio_X = weighted_allocation_for_prio_X +
    extra_alloc
    else if (Sum (Px) < weighted_allocation_for_prio_X)
    weighted_allocation_for_prio_X = Sum (Px)
done
// If there is still bandwidth available distribute it among priorities
according to weight
if (Spare_bw > 0)
    For X in priority
    do
    extra_alloc = Spare_bw * weight_x/100
    Spare_bw = Spare_bw − extra_alloc
    weighted_allocation_for_prio_X = weighted_allocation_for_prio_X +
    extra_alloc
done
// Calculate per priorities allocation at local Logic
```

-continued

```
For all Px > 0
do
    next_budget_for_prio_X += (Px_local/Sum(Px) )*
    (weighted_allocation_for_prio_X)
    total_net_budget += next_budget_for_prio_X
done
// Calculate the new weights for each priority for local Logic
For all Px > 0
do
New_weight_for_X = (net_budget_for_prio_X / total_net_budget) * 100
done
```

In this example, spare bandwidth across cluster may be determined based on sync information from the nodes in the cluster. This spare bandwidth is then allocated to all nodes which requires excess bandwidth than what has previously been allocated to these nodes. This allocation may be completed based on the weight and priority of the traffic.

If there remains further spare bandwidth, the spare bandwidth may be allocated to each priority based on demand. Once additional bandwidth has been allocated to each priority weight per priority for a given interval, the bandwidth may be recalculated based on the total bandwidth allocated to priority on that node. These new weights may be passed to or retrieved by the packet processing node.

The following relates to further embodiments of a system and method for managing and/or prioritizing network traffic in a distributed environment. In these embodiments, the system and method are intended to provide what is termed "Fair Split" shaping. The idea behind Fair Split shaping is to distribute bandwidth fairly among a set of logical objects or the like. A shaper object can be configured to perform Fair Split Shaping by configuring the split criteria as a standalone criterion or in addition to other shaper characteristics. The split criteria can define how total bandwidth should be divided. For example, one of the split criteria could be Host, which indicates that the total bandwidth should be divided equally among all hosts. Other split criteria may include, for example, location, connection, subscriber attributes, application, priority, plan, or the like.

In some embodiments, the system and method may also provide the priority-type of shaping described above in addition to the fair split shaping, by providing additional shapers, parent shapers, fair child shapers or the like. In some cases, the fair split may be performed in advance of priority shaping while, in others, priority shaping may be performed after fair split shaping. It will be understood that, in some cases, an ISP or the like may determine that the fair split based on one of the split criteria may not be equal and could be weighted or otherwise adapted depending on the criteria or objectives of the network.

The concept of fair split management or shaping can be understood with an example. In a network, cluster, or the like, a pool of bandwidth, for instance 100 Mbps, is being shared between 20 subscribers. If the bandwidth sharing limits were static, each subscriber would get 5 Mbps, no more. If some of the subscribers would be inactive, this would waste a lot of bandwidth. Thus, this unused bandwidth could be "borrowed" by the active subscribers. If the inactive subscribers come back, they would generally get priority for their own part of the bandwidth, and if all 20 subscribers are active they would each get 5 Mbps (if they each had traffic throughput of at least 5 Mbps).

However, in this situation, the borrowed traffic may not be fairly shared between the active users. If the static limit is set too low, there could still be unfairness in this example network. Some subscribers would be using less than 5 Mbps because they were inactive or simply did not need more bandwidth. Some subscribers would be using a lot of bandwidth, maybe 10 Mbps or more, because their applications were aggressively consuming the bandwidth. In some cases, some subscribers may get 5 Mbps though they may have traffic that would benefit from more. If the 5 Mbps limit is set higher, the "guaranteed" bandwidth would be over committed, and a subscriber might not receive the minimum guaranteed bandwidth.

A solution to this problem may be referred to as Fair split, which is intended to provide a dynamic limit for the subscribers, where a guaranteed level can be set according to how many subscribers are active. If 10 subscribers are active, the limit is set to be 10 Mbps per subscriber, and if all 20 are active, this limit is 5 Mbps. Thus, an active subscriber gets exactly their fair share of available bandwidth, and any bandwidth not currently actually being used, can then be available to other subscribers as "borrowing".

To accomplish fair-split shaping, two types of shaping objects are intended to be created, a Parent Shaping Object, which describes the total shaper bandwidth and one or more Fair Child Shaping Objects, which can be created whenever Parent Shaping Object's bandwidth needs to be divided. For example, if a splitting criterion for the bandwidth has been predetermined to be Host, for every unique host that sends traffic to a Logic module, a Fair Child Shaping Object is created. The bandwidth allocated to the Fair Child Shaper Object is calculated based on total active subscribers and total available bandwidth (Bandwidth of Parent Shaper Object/Total Active Subscriber). Total Active Subscribers can be updated periodically, for example, every 100 milliseconds, every second, or the like. Generally speaking, a Parent Shaper Object's bandwidth total can be used as a pool to determine the bandwidth available to be used by each fair child shaping object of that parent.

In a distributed environment, to accomplish Fair Split shaping, it is helpful to know the number of active subscribers and how much bandwidth each subscriber is using. If these items are available, a shaper object can then determine the current Fair Share per subscriber and how much spare bandwidth is available so that it can be allocated to subscribers needing or wanting more bandwidth than allocated with their Fair Share.

In a distributed deployment, traffic is distributed across various Logic modules/nodes and a shaper object at one Logic node may not be aware of the number of active subscribers associated with the other Logic nodes, similarly it may not be possible to know how much spare bandwidth can be allocated because each shaper object is unaware of the demands of active subscribers on other distributed Logic modules.

In embodiments of the system and method herein, this situation may be addressed by sharing information among a plurality of Fair Child Shaping Objects at each Logic node on a periodic basis. This sharing of information may be provided for any appropriate division of the network, for example, a cluster of two or more Logic nodes or the like.

With this information, each Logic node can generate a global view of the division, for example the network or the cluster, and can predict how much traffic each fair child shaping object can forward. Based on this information, the bandwidth associated with the Logic Node can be allocated to fair child shaping objects via a parent shaping object for the next periodic update.

The following examples illustrate behavior of fair split shaping in distributed systems. For simplicity, the predetermined synchronization interval (sync interval) is assumed as 1 second but could be adjusted based on the needs of the network or system.

Example 1 (Unique IPs)

Configuration: Traffic Distribution:

| |
|---|
| Shaper Rate: 100 Mbps<br>Distribution Criteria: Unique IP (Host)<br>Number of Logic Nodes: 3 |

| |
|---|
| 4 Unique IPs (4.0.0.0 to 4.0.0.3) on Logic-1<br>3 Unique IPs (4.0.0.4 to 4.0.0.6) on Logic-2<br>3 Unique IPs (4.0.0.7 to 4.0.0.9) on Logic-3 |

Example-1.1: (Equal Distribution Among Cluster)

Assuming each Internet Protocol address (IP) is transmitting 10 Mbps of traffic, the desired behavior in the cluster is:

| |
|---|
| Logic-2 I/P: 30 Mbps O/P: 30 Mbps |
| Parent Shaping Object B/W allocation: 30 Mb<br>Fair Child (4.0.0.4) B/w Allocation: 10 Mb<br>Fair Child (4.0.0.5) B/w Allocation: 10 Mb<br>Fair Child (4.0.0.6) B/w Allocation: 10 Mb |

| |
|---|
| Logic-1 I/P: 40 Mbps O/P: 40 Mbps |
| Parent Shaping Object B/W allocation: 40 Mb<br>Fair Child (4.0.0.0) B/w Allocation: 10 Mb<br>Fair Child (4.0.0.1) B/w Allocation: 10 Mb<br>Fair Child (4.0.0.2) B/w Allocation: 10 Mb<br>Fair Child (4.0.0.3) B/w Allocation: 10 Mb |

| |
|---|
| Logic-3 I/P: 30 Mbps O/P: 30 Mbps |
| Parent Shaping Object B/W allocation: 30 Mb<br>Fair Child (4.0.0.7) B/w Allocation: 10 Mb<br>Fair Child (4.0.0.8) B/w Allocation: 10 Mb<br>Fair Child (4.0.0.9) B/w Allocation: 10 Mb |

Example 1.2: (Borrowing within Logic Nodes)

Assuming host 4.0.0.0 and host 4.0.0.3 are handling 18 Mbps each and host 4.0.0.1 and 4.0.0.2 are handling 2 Mbps each on Logic-1 whereas host 4.0.0.4 to 4.0.0.9 are handling 10 Mbps on Logic-2 & Logic-3, the following may be the desired behavior in the cluster.

| |
|---|
| Logic-1 I/P: 40 Mbps O/P: 40 Mbps |
| Parent Shaping Object B/W allocation: 40 Mb<br>Fair Child (4.0.0.0) B/w Allocation: 18 Mb<br>Fair Child (4.0.0.1) B/w Allocation: 2 Mb<br>Fair Child (4.0.0.2) B/w Allocation: 2 Mb<br>Fair Child (4.0.0.3) B/w Allocation: 18 Mb |

| |
|---|
| Logic-2 I/P: 30 Mbps O/P: 30 Mbps |
| Parent Shaping Object B/W allocation: 30 Mb<br>Fair Child (4.0.0.4) B/w Allocation: 10 Mb<br>Fair Child (4.0.0.5) B/w Allocation: 10 Mb<br>Fair Child (4.0.0.6) B/w Allocation: 10 Mb |

| |
|---|
| Logic-3 I/P: 30 Mbps O/P: 30 Mbps |
| Parent Shaping Object B/W allocation: 30 Mb<br>Fair Child (4.0.0.7) B/w Allocation: 10 Mb<br>Fair Child (4.0.0.8) B/w Allocation: 10 Mb<br>Fair Child (4.0.0.9) B/w Allocation: 10 Mb |

Example 1.3: (Borrowing to Remote Logic Nodes)

Assuming host 4.0.0.0 to host 4.0.0.3 are handling 6 Mbps each but host 4.0.0.4 and 4.0.0.2 are handling 12 Mbps each on Logic-1 whereas at Logic-2, host 4.0.0.4 handling 4 Mbps and host 4.0.0.5 to 4.0.0.9 are handling traffic at 12 Mbps on Logic-2 & Logic-3, the following may be a desired behavior in the cluster

| |
|---|
| ActiveLogic-2 I/P: 28 Mbps O/P: 28 Mbps |
| Parent Shaping Object B/W allocation: 28 Mb<br>Fair Child (4.0.0.4) B/w Allocation: 4 Mb<br>Fair Child (4.0.0.5) B/w Allocation: 12 Mb<br>Fair Child (4.0.0.6) B/w Allocation: 12 Mb |

| |
|---|
| ActiveLogic-1 I/P: 36 Mbps O/P: 36 Mbps |
| Parent Shaping Object B/W allocation: 36 Mb<br>Fair Child (4.0.0.0) B/w Allocation: 6 Mb<br>Fair Child (4.0.0.1) B/w Allocation: 12 Mb<br>Fair Child (4.0.0.2) B/w Allocation: 12 Mb<br>Fair Child (4.0.0.3) B/w Allocation: 6 Mb |

| |
|---|
| ActiveLogic-3 I/P: 36 Mbps O/P: 36 Mbps |
| Parent Shaping Object B/W allocation: 36 Mb<br>Fair Child (4.0.0.7) B/w Allocation: 12 Mb<br>Fair Child (4.0.0.8) B/w Allocation: 12 Mb<br>Fair Child (4.0.0.9) B/w Allocation: 12 Mb |

Example-1.4: (Equal Distribution Among Cluster with Drops on Some)

Assuming each IP is handling 12 Mbps of traffic at Logic-1, 11 Mbps of traffic at Logic-2 and 10 Mbps each, the following may be a desired behavior in the cluster

| |
|---|
| Logic-1 I/P: 48 Mbps O/P: 40 Mbps |
| Parent Shaping Object B/W allocation: 40 Mb<br>Fair Child (4.0.0.0) B/w Allocation: 10 Mb<br>Fair Child (4.0.0.1) B/w Allocation: 10 Mb<br>Fair Child (4.0.0.2) B/w Allocation: 10 Mb<br>Fair Child (4.0.0.3) B/w Allocation: 10 Mb |

| Logic-2 I/P: 33 Mbps O/P: 30 Mbps |
| --- |
| Parent Shaping Object B/W allocation: 30 Mb<br>Fair Child (4.0.0.4) B/w Allocation: 10 Mb<br>Fair Child (4.0.0.5) B/w Allocation: 10 Mb<br>Fair Child (4.0.0.6) B/w Allocation: 10 Mb |

| Logic-3 I/P: 30 Mbps O/P: 30 Mbps |
| --- |
| Parent Shaping Object B/W allocation: 30 Mb<br>Fair Child (4.0.0.7) B/w Allocation: 10 Mb<br>Fair Child (4.0.0.8) B/w Allocation: 10 Mb<br>Fair Child (4.0.0.9) B/w Allocation: 10 Mb |

Example 2 (Overlapping IPs)

Configuration: Traffic Distribution:

| |
| --- |
| Shaper Rate: 100 Mbps<br>Distribution Criteria: Unique IP (Host)<br>Number of Logic: 3 |

| |
| --- |
| Logic-1 4.0.0.0, 4.0.0.1, 4.0.0.2, 4.0.0.3<br>Logic-2 4.0.0.0, 4.0.0.1, 4.0.0.4, 4.0.0.5, 4.0.0.6<br>Logic-3 4.0.0.0, 4.0.0.6, 4.0.0.7, 4.0.0.8, 4.0.0.9 |

Traffic from 4.0.0.0 is seen on all 3 Logic nodes, while traffic from 4.0.0.1 is seen on both Logic-1 and Logic-2. Further, traffic from 4.0.0.6 is seen on Logic-2 and Logic-3

Assuming all IP addresses are handling more than 10 Mbps traffic and overlapping IP addresses are handling traffic equally on all Logic nodes, the desired results may be as follows:

| Logic-2 I/P: 33.3 Mbps O/P: 33.3 Mbps |
| --- |
| Parent Shaping Object B/W allocation:<br>33.33 Mb<br>Fair Child (4.0.0.0) B/w Allocation: 3.33 Mb<br>Fair Child (4.0.0.1) B/w Allocation: 5.00 Mb<br>Fair Child (4.0.0.4) B/w Allocation: 10.0 Mb<br>Fair Child (4.0.0.5) B/w Allocation: 10.0 Mb<br>Fair Child (4.0.0.6) B/w Allocation: 5.0 Mb |

| Logic-1 I/P: 28.3 Mbps O/P: 28.3 Mbps |
| --- |
| Parent Shaping Object B/W allocation:<br>28.33 Mb<br>Fair Child (4.0.0.0) B/w Allocation: 3.33 Mb<br>Fair Child (4.0.0.1) B/w Allocation: 5.00 Mb<br>Fair Child (4.0.0.2) B/w Allocation: 10.0 Mb<br>Fair Child (4.0.0.3) B/w Allocation: 10.0 Mb |

| Logic-3 I/P: 38.3 Mbps O/P: 38.3 Mbps |
| --- |
| Parent Shaping Object B/W allocation:<br>38.33 Mb<br>Fair Child (4.0.0.0) B/w Allocation: 3.33 Mb<br>Fair Child (4.0.0.6) B/w Allocation: 5.00 Mb<br>Fair Child (4.0.0.7) B/w Allocation: 10.0 Mb |

| Logic-3 I/P: 38.3 Mbps O/P: 38.3 Mbps |
| --- |
| Fair Child (4.0.0.8) B/w Allocation: 10.0 Mb<br>Fair Child (4.0.0.9) B/w Allocation: 10.0 Mb |

As seen in the above examples, fair split shaping is intended to be managed at the system level (for example, across a cluster, across the network, or the like). The system is intended to provide for fairness and does not require a node level affinity to subscribers and/or IP addresses. It will be understood that any subscriber and/or IP address can appear/disappear on any Logic Node randomly. Embodiments having the fair split shaping approach are not limited to the examples above but can be configured to various scenarios where subscribers/activities are split, or traffic flows moves from one Logic node to another Logic node. Embodiments can also be configured to handle a situation where, at a particular point in time a Logic node caters too-many subscribers, and at other times the Logic node is catering to a smaller number of subscribers.

Figure 10:
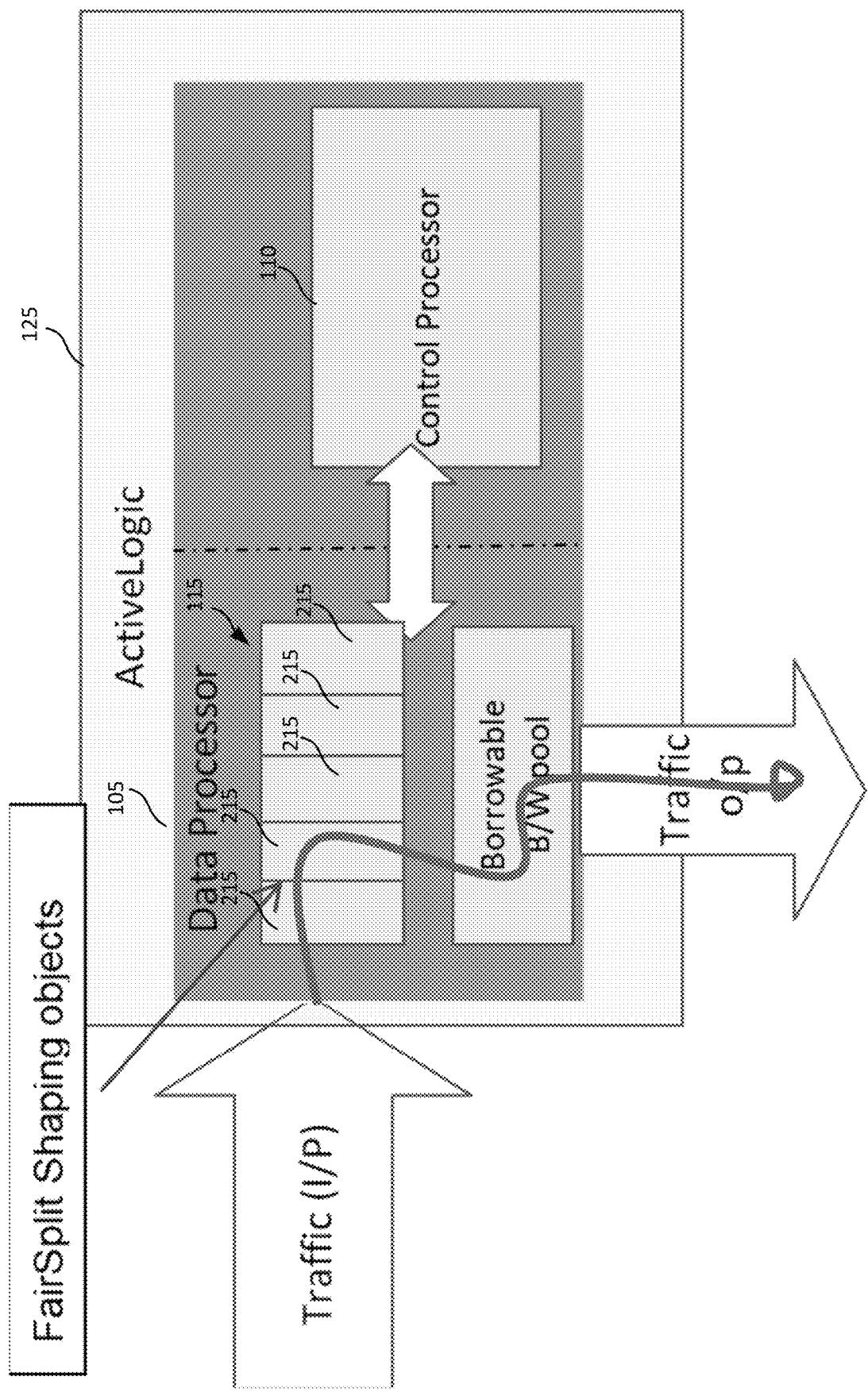
FIG. 10 illustrates a system for prioritizing network traffic via distributed shaping according to another embodiment.

FIG. 10 illustrates an embodiment of a Logic node in a cluster or network using a Fair Split approach. Similar to the previously described logic nodes, the Logic node 125 is intended to include a data processor 105, sometimes referred to as a packet processor, and a control processor 110. The system further includes at least one shaping object 115, which in this embodiment are intended to include a parent shaping object and at least one child shaping object. The traffic is received via the data processor 105. Traffic flow data and statistics are collected and shared with the control processor 110. The traffic flows may then be shaped by the at least one shaping object 115 as detailed herein.

In embodiments herein, a shaper object can be configured to shape traffic in different ways and at various times. A shaper object may be configured in advance or may be configured when in operation by using, for example an MPE (a control plane element), a user interface, or the like. In some cases, configurable parameters may include:

1. Rate at which traffic is to be shaped in per second or other time intervals;
2. Criteria to split the available bandwidth, which may be equally or proportional (Criteria, may include: Subscriber attribute, IP address, Application protocol, or other criteria);
3. Sync Interval (Rate at which information is exchanged between various Logic nodes);
4. Rules to match the traffic that should be sent to the shaper object;
5. Percentage of spare bandwidth that can be loaned to Peer Logic Node;
6. Percentage of bandwidth that can be loaned to Local Fair Child Objects within a Logic Node; and the like.

Parameters 5 and 6 are intended to allow embodiments of the system and method to be tunable by a user to decide how much bandwidth each node may be willing to loan to other nodes and how much each child object is willing to share with their siblings within same node. This allows for a setting of how much bandwidth may be contributed to a borrowable pool from which other fair child shaper objects at the local or remote nodes can borrow once they consume their own quota.

Once a shaper object's configuration is input or received, the Control Processor 110 sends the configuration to the Data Processor and the Data Processor creates a logical entity for the Shaper Object 115 with the respective configuration. The shaper object may include a plurality of fair split shaping objects 215 which are intended to be either Parent Fair shaping objects and/or Child fair shaping objects. It will be understood that there is intended to be a single Parent shaping object and one or more fair child shaping objects. After which the Data processor is configured to send the associated traffic flow to the configured Shaper Object, which will perform shaping. In this example, the shaping may be performed by the fair splitchild shaping object, which is intended to shaping the matching traffic to the configured shaper. If there is a split already available, the traffic will be shaped by the fairsplit shaper to this split. If there is a new split to be created, based on split criteria, then the traffic may be shaped by a new or additional fairsplit shaping object.

At each interval usage statistics of each shaper objects 115 in the logic node 125 will be collected and sent to the Control Processor 110. The control processor 110 is configured to distribute the information to other Logic nodes and aggregate information from across a cluster or the like. The Control processor 110 is further configured to predict the available bandwidth per shaper object and update each shaper object via the Data Processor 105.

Figure 11:
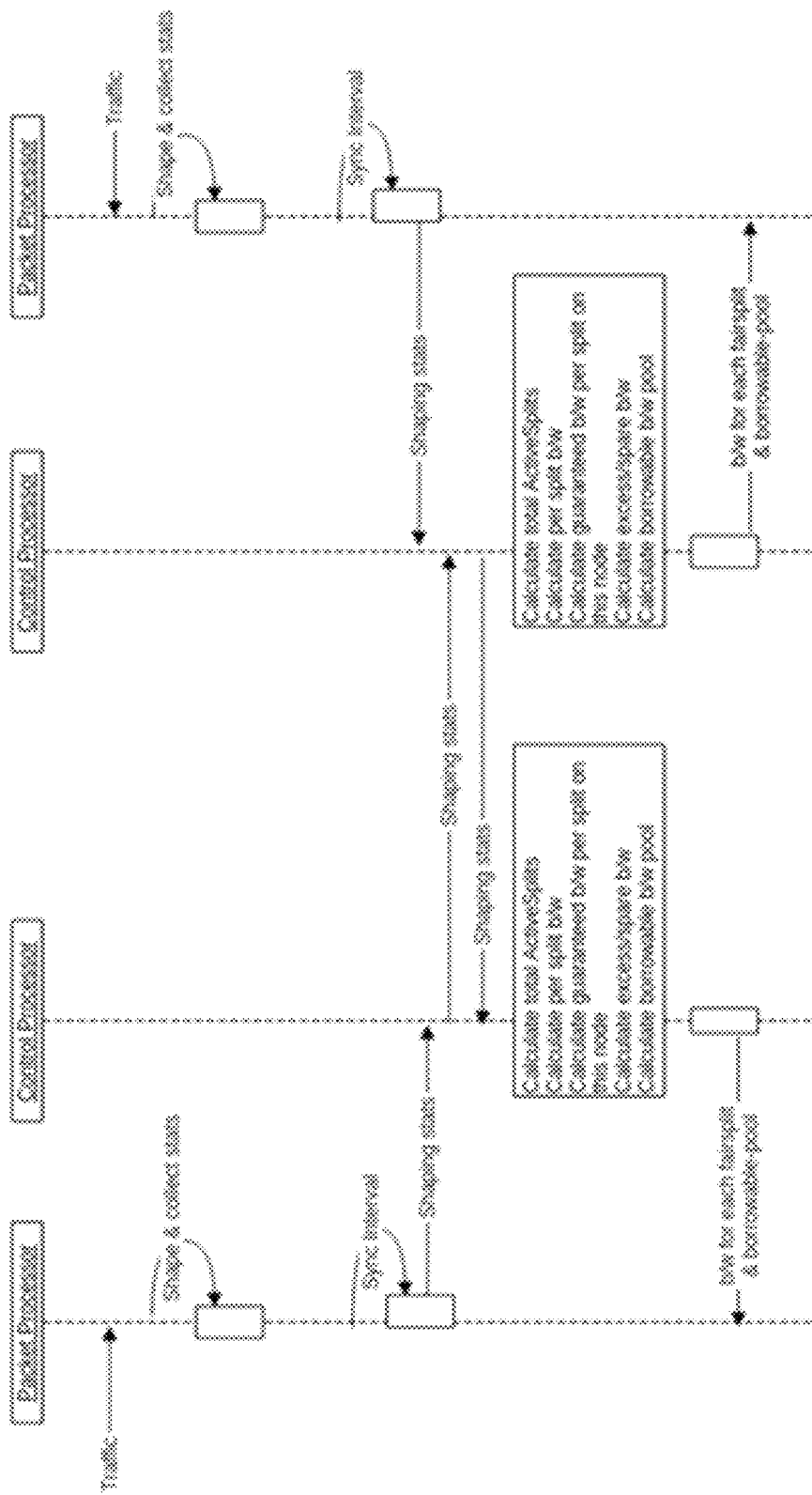
FIG. 11 is a sequence diagram for a method for prioritizing network traffic via distributed shaping according to another embodiment.

FIG. 11 illustrates a sequence diagram of the traffic flow with respect to fair split shaping. Initially at each Logic node, the Control Processor 110 is configured to allocate 100% bandwidth of the Parent Shaper object operating in the Packet Processor 105. This amount of the bandwidth is available for all the traffic that will be received at next interval. This may also be the Minimum Guaranteed Bandwidth for parent object for the first interval.

As and when traffic for a different split criteria is seen, a new Fair Child object may be created. The new Fair Child shaping object is allocated a fair share of the bandwidth from the Parent Shaper object. The Parent Shaper object is configured to determine this available bandwidth and total active splits to determine the new Fair Child shaping object's allocation.

A running count of number of Active Splits is maintained which is incremented when a new Fair Child Object is created. As shown in the sequence diagram in FIG. 11, this may be determined at each iteration by the Control Processor. In some cases, a Fair Child Shaping object may be removed and the running active splits count may be decremented when traffic for a split is not seen for a predetermined interval, for example, 2 seconds, 5 seconds or the like. In some cases, the system may use an exponential moving average of the active copies received at every interval across the cluster. The number of active splits may be collected from each logic node and aggregated. The logic node is further configured to determine an exponential moving average (EMA) for each interval. The EMA is intended to provide for fluctuations in the number of active splits. This process may be finetuned by giving a higher weight to more recent counts by adjusting the parameters in the EMA formula.

At each sync interval, each Fair Child Object is configured to send traffic data regarding the input traffic that the Fair Child Object processed in the previous interval to the Control Processor 110. The Control Processor is intended to communicate this information to the other Logic nodes operating in the distributed system.

The Control Processor 110 also calculates how much spare/excess bandwidth was demanded in the previous interval for the associated parent shaper object. The Control Processor is configured to share this information across the other Logic nodes operating in the distributed system. Excess and Spare bandwidth may be determined based on the how much overall bandwidth was allocated to parent object for the last interval or iteration and how much less/excess demand (sum of the demands seen on fair child objects) was seen in the last interval.

The Control Processor at each of the Logic nodes within the system receives the information regarding demands per fair child object and overall excess and spare bandwidth for parent object. Based on this information allocation of the bandwidth may be completed for the Parent Shaping Object associated with the Control Processor and each of the Fair Child Shaping Object associated with the Parent Shaping Object.

In some cases, the Control Processor may initially allocate 100% configured bandwidth to Parent Shaper Object at each Logic node. When the traffic is received at the Logic node, the Data Processor associated with the Logic node parses the traffic and determines if the traffic should be processed by a shaper object. If yes, then the Data Processor creates one or more fair child shaping objects if fair child objects have not been created already. The bandwidth allocated to each fair child shaping object can be determined by, for example, Total bandwidth of parent shaper object/(number_of_active_fair_child_objects+1). Incoming traffic packets are queued at fair child shaping queue and total input bytes for this traffic packets are aggregated for each child fair object as well as the parent shaping object. Aggregated input byte values may be sent periodically, for example, at each sync interval, to the Control Processor as the demand for shaper object An example message is as follows:

Message: Shaper_Utilization_Details

From: PacketProcessor

To: Control Processor

Contents:

| Fair Child Object 1: demand | Fair Child Object 2: demand | . . . . . . . . . . . . . . . . . . . . . | Parent Shaping Object: demand |
|---|---|---|---|

The Control Processor 110 stores this information in a memory component, and is further configured to forward the information for each fair child object to all the other Control Processors operating in Logic modules of the cluster, for example, over UDP protocol. In addition, the control processor processes the Parent Shaping Object's demand to calculate total excess/less traffic received at the associated Logic node then what was predicted and allocated in the earlier prediction interval. This information is also sent to the other Control Processors operating in Logic nodes of the cluster. An example message is as follows:

Message: Shaper_Utilization_Details

From: Control Processor (local)

To: Control Processor (remote)

Contents:

| Fair Child Object 1: demand | Fair Child Object 2: demand | . . . . . . . . . . . . . . . . . . . . | Parent Shaping Object: excess/spare demand |
|---|---|---|---|

For each Sync Interval, the Control processor 110 may aggregate the received information from with the information determined itself per shaping object. In particular, the Control processor 110 may determine:

1. Total Demand received for each fair child object;
2. Total Excess demand for parent shaping object;
3. Total Spare demand for parent shaping object; and the like.

The control processor 110 may further store this information in a memory component. The control processor is intended to determine the bandwidth that can be allocated to Parent Shaper Object and individual Fair Child shaper objects. This information, once determined may be forwarded to the data Processor associated with the local Logic node to apply shaping. An example message is as follows:

Message: Shaper_Utilization_Details
From: Control Processor (local)
To: Packet Processor (local)
Contents:

| Fair Child Object 1: Bandwidth | Fair Child Object 2: Bandwidth | ... | ... | ... | Parent Shaping Object: borrowable bandwidth pool |
|---|---|---|---|---|---|

Figure 12:
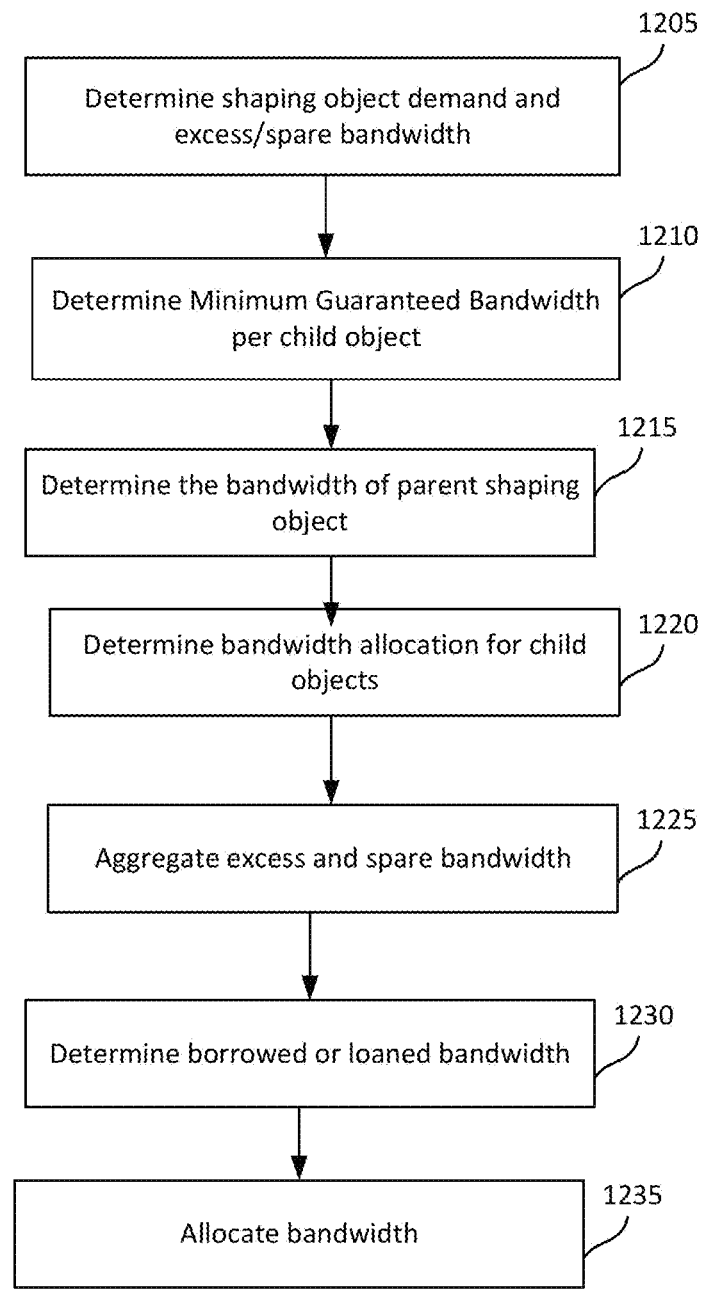
FIG. 12 is a flow chart for a method for prioritizing network traffic via distributed shaping according to another embodiment.

FIG. 12 illustrates a method 1200 for fair shaping in a distributed shaping network. At 1205, a per shaping object demand is determined. For each fair child shaping object, a demand is determined from the packet processor and sent to each control processor in each Logic node in the cluster.

For each parent object, the control processor may determine how much excess/spare bandwidth is seen in last interval based on the last interval's traffic flow. The Minimum Guaranteed bandwidth for the parent object and demand received in last interval is determined and stored. If excess demand is seen, then forward the excess demand for parent to all Logic Nodes. If there is spare bandwidth, the Control processor may send the percentage of spare guaranteed bandwidth that can be loaned to peer Logic nodes to the available peer Logic Nodes. It will be understood that the percentage of spare or the total of excess demand may be provided in various measurements to the other Logic nodes, for example, total spare bandwidth or similar measurements to convey the bandwidth situation.

In a specific example, the system may determine the spare bandwidth that may be kept locally and not sent to peers as:
local_borrowable_spare_parent=max (total_spare—total_spare*percent_borrowable_cluster_wide, 0).

At 1210, the system is configured to determine the Minimum Guaranteed Bandwidth for each Fair Child Object. In some cases, the control processor may determine the MGB by the following: fair_split_mgb_child=child_demand_local/child_demand_total*(configured_shaper_bw/active_fair_child_objects).

At 1215, the control processor may determine the fair split bandwidth of the parent shaping object. In some cases, this may be determined by aggregating the bandwidth for each fair child object associated with the parent object, for example: fair_split_mgb_parent=sum (fair_split_bw_child).

At 1220, the control processor will determine whether there is any free or "borrow-able" bandwidth and the guaranteed bandwidth allocation for each fair child object at each local logic node. In some cases, this may be determined as follows: fair_split_gb_child=fair_split_mgb_child—fair_split_mgb_child*percent_borrowable_local and Local_borrowable_spare_child=local_borrowable_spare_child+fair_split_mgb_child*percent_borrowable_local.

At 1225, each control processor at each of the Logic nodes is may aggregate excess and spare demand across the cluster. In some cases the Control nodes may each sum excess/spare bandwidth received from each Logic peer in the cluster for the parent object as follows:

Total Excess demand=Sum of all excess bandwidth send by Peer ActiveLogic

Total Spare demand=Sum of all spare bandwidth send by Peer ActiveLogic

Once the demand is determined, the control processor is configured to determine how much bandwidth can be either borrowed from for loaned to other Logic nodes. In one example, the control processor may use the following if total demand is more than total spare (Total Excess demand for parent shaping object>=Total Spare demand for parent shaping object):

If parent has seen excess demand then the parent's allocation in the last interval, the control processor determines the borrowable share using, for example:

borrow_at_local=local_excess_demand/total_excess_demand*(Total Spare demand for parent shaping object)
else
borrow_at_local=0

If total demand is less than total spare (Total Excess demand for parent shaping object<Total Spare demand for parent shaping object) then:

If parent has seen excess demand then its allocation in last interval, calculate the borrow-able share using following formula:

borrow_at_local=local_excess_demand
else
borrow_at_local=0

After the borrowed and/or loaned bandwidth is determined, the Parent Shaping Object and Fair Child Shaping Objects bandwidth that can be spent locally after borrowing/lending the available bandwidth from/to other Logic nodes in the cluster along with borrow-able pool bandwidth is determined at 1235. The system is configured to send "fair_split_gb_child" to each of the Fair Child Shaping objects operating at packet processor and send Sum (borrow at local, local borrowable_spare_parent, local borrowable spare child) to the packet processor as a borrowable pool that can be used by the fair child objects after each of the fair child object have finished their own guaranteed bandwidth allocated to them.

Embodiments of the system and method are intended to fairly split the bandwidth amongst a set of distributed shapers. It is intended that the system and method provide for a minimum bandwidth guarantee for selected split criteria while optimizing the use of the total bandwidth. By providing shared data with respect to excess demand or spare bandwidth, each logic module is configured to determine an appropriate bandwidth locally as well as have knowledge of the bandwidth within the set of distributed logic modules, for example, a cluster, a network, or the like.

In the preceding description, for purposes of explanation, numerous details are set forth in order to provide a thorough understanding of the embodiments. However, it will be apparent to one skilled in the art that these specific details may not be required. It will also be understood that aspects of each embodiment may be used with other embodiments even if not specifically described therein. Further, some embodiments may include aspects that are not required for their operation but may be preferred in certain applications. In other instances, well-known structures may be shown in block diagram form in order not to obscure the understanding. For example, specific details are not provided as to whether the embodiments described herein are implemented as a software routine, hardware circuit, firmware, or a combination thereof.

Embodiments of the disclosure or elements thereof can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with other modules and elements, including circuitry or the like, to perform the described tasks.

The above-described embodiments are intended to be examples only. Alterations, modifications and variations can be effected to the particular embodiments by those of skill in the art without departing from the scope, which is defined solely by the claim appended hereto.

What is claimed is:

1. A system for managing network traffic in a distributed environment, the system comprising:
   a plurality of logic modules configured to determine policy data related to bandwidth management and at least one split criteria for a basis for shaping network traffic;
   a control processor associated with each one of the plurality of logic modules, each control processor configured to determine data associated with each of a plurality of traffic flows at the associated logic module and to coordinate traffic actions over the plurality of logic modules wherein each of the control processors is further configured to determine a fair split bandwidth for each of the plurality of logic modules and within each of the plurality of logic modules based on the policy data;
   a packet processor associated with each control processor and configured to determine a traffic action based on each traffic flow and received policy data;
   at least two shaper objects configured to receive a split of the traffic flows and enforce the determined traffic action on their respective traffic flow; and
   a data processor configured to receive a fair split bandwidth from the control processor and to create a fair child shaper object within each of the shaper objects for each split at the logic module based on at least one split criteria, wherein the traffic actions for each of the fair child shaper objects are coordinated and the coordinated traffic actions are shared with each control processor associated with each of the plurality of logic modules.

2. The system according to claim 1 wherein the policy data comprises available bandwidth in the distributed environment and the available bandwidth is allocated across the plurality of logic modules based on fair split principles.

3. The system according to claim 1 wherein the split criteria is selected from the group comprising: hostname, location, priority, subscriber plan, and application type.

4. The system of claim 1 wherein the control processor is configured to determine whether an additional fair child shaper object is required based on the split criteria and the plurality of traffic flows.

5. The system of claim 1 wherein the packet processor is configured to update a number of active splits at a predetermined interval.

6. The system of claim 1 wherein the data processor is configured to determine a borrowable pool of bandwidth from each of the at least two shaper objects.

7. The system of claim 1 wherein each of the logic nodes is configured to share the borrowable pool of bandwidth among any shaper object that requires further bandwidth.

8. A method for managing network traffic in a distributed environment, the method comprising:
   determining policy data related to bandwidth management and at least one split criteria for a basis for shaping network traffic, via a plurality of logic nodes;
   periodically: determining traffic flow data associated with each of a plurality of traffic nodes at an associated logic nodes;
   aggregating traffic flow data among the plurality of logic nodes to provide bandwidth requirements and determining a traffic action based on each traffic flow and the policy data;
   determining a fair split bandwidth for each of the plurality of logic modules and within each plurality of logic modules based on the policy data and communicating the fair split bandwidth to each of the plurality of logic modules;
   splitting the traffic flows to at least two shaper objects based on the traffic action and the at least one split criteria,
   creating a fair child shaper object within each of the shaper objects for each split at the logic module based on at least one split criteria;
   coordinating the traffic actions for each of the fair child shaper object; and
   sharing the coordinated traffic actions among each control processor associated with each of the plurality of logic modules.

9. The method according to claim 8 wherein the policy data comprises available bandwidth in the distributed environment and the available bandwidth is allocated across the plurality of logic modules based on fair split principles.

10. The method of claim 9 further comprising:
    determining a borrowable bandwidth pool based on available bandwidth, bandwidth requirements and traffic flow data;
    communicating the borrowable bandwidth pool among the plurality of logic nodes; and
    configuring the at least two shaper objects at each of the logic nodes to shape traffic according to the borrowable bandwidth pool.

11. The method according to claim 8 wherein the split criteria is selected from the group comprising: hostname, location, priority, subscriber plan, and application type.

12. The method of claim 8 further comprising: determining whether an additional fair child shaper object is required based on the split criteria and the plurality of traffic flows.

13. The method of claim 8 further comprising updating a number of active splits at a predetermined interval.

\* \* \* \* \*